US012754008B2

(12) United States Patent
Binder

(10) Patent No.: US 12,754,008 B2
(45) Date of Patent: Oct. 6, 2026

(54) SENSOR DEVICES COMPRISING TWO DIFFERENTIAL MAGNETIC FIELD SENSORS

(71) Applicant: Infineon Technologies AG, Neubiberg (DE)

(72) Inventor: Gernot Binder, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 170 days.

(21) Appl. No.: 18/765,679

(22) Filed: Jul. 8, 2024

(65) Prior Publication Data

US 2025/0035424 A1 Jan. 30, 2025

(30) Foreign Application Priority Data

Jul. 26, 2023 (DE) ........................ 102023119832.7

(51) Int. Cl.
*G01B 7/30* (2006.01)
*G01D 5/16* (2006.01)

(52) U.S. Cl.
CPC *G01B 7/30* (2013.01); *G01D 5/16* (2013.01)

(58) Field of Classification Search
CPC . G01B 7/30; G01D 5/16; G01D 5/244; G01D 5/24485; G01D 3/036; G01D 5/145; G01D 5/245; G01D 5/2452; G01D 2205/40
See application file for complete search history.

(56) References Cited

U.S. PATENT DOCUMENTS

| | | | |
|---|---|---|---|
| 9,341,463 | B2 | 5/2016 | Ritter et al. |
| 10,914,568 | B2 | 2/2021 | Ausserlechner et al. |
| 11,320,497 | B2 | 5/2022 | Hammerschmidt et al. |
| 11,598,826 | B2 | 3/2023 | Amano et al. |
| 2004/0004471 | A1 | 1/2004 | Haas et al. |
| 2008/0238417 | A1 | 10/2008 | Suzuki |
| 2010/0134095 | A1 | 6/2010 | Loreit et al. |
| 2018/0364066 | A1 | 12/2018 | Satz et al. |
| 2019/0120914 | A1* | 4/2019 | Hammerschmidt ......................... G01R 33/0023 |
| 2020/0232822 | A1* | 7/2020 | Weiland .................. G01P 3/487 |

FOREIGN PATENT DOCUMENTS

| | | | |
|---|---|---|---|
| DE | 102013000430 | A1 | 7/2014 |
| DE | 102018114131 | A1 | 12/2018 |
| DE | 102017124542 | A1 | 4/2019 |
| DE | 102020213092 | A1 | 9/2021 |
| DE | 102016118384 | B4 | 10/2023 |
| JP | 2006084416 | A | 3/2006 |
| WO | 0216864 | A1 | 2/2002 |
| WO | 2002016864 | A1 | 2/2002 |

* cited by examiner

*Primary Examiner* — Son T Le
(74) *Attorney, Agent, or Firm* — Harrity & Harrity, LLP

(57) ABSTRACT

A sensor device contains a magnet, a first differential magnetic field sensor mounted on a first surface of the magnet, and a second differential magnetic field sensor mounted on a second surface of the magnet, the second surface being situated opposite the first surface.

25 Claims, 12 Drawing Sheets

SENSOR DEVICES COMPRISING TWO DIFFERENTIAL MAGNETIC FIELD SENSORS

CROSS-REFERENCE TO RELATED APPLICATION

This application claims priority to German Patent Application No. 102023119832.7 filed on Jul. 26, 2023, the content of which is incorporated by reference herein in its entirety.

TECHNICAL FIELD

The present disclosure relates to sensor devices comprising two differential magnetic field sensors. Furthermore, the disclosure relates to methods for producing such sensor devices.

BACKGROUND

Magnetic field sensors can be used in various (e.g., automotive) applications. In one example, magnetic field sensors can be used to detect a position or an angle of a wheel or a shaft. In a further example, magnetic field sensors can be used to determine wheel speeds. Conventional magnetic field sensors may often suffer from a low accuracy of their measurement results and a lack of interference immunity vis-à-vis magnetic stray fields. Manufacturers and developers of magnetic field sensors constantly endeavour to improve their products. There may be interest here in particular in developing cost-effective magnetic field sensors having high measurement accuracy and insensitivity vis-à-vis magnetic stray fields.

SUMMARY

Various aspects relate to a sensor device. The sensor device includes a magnet, a first differential magnetic field sensor mounted on a first surface of the magnet, and a second differential magnetic field sensor mounted on a second surface of the magnet, the second surface being situated opposite the first surface.

Various aspects relate to a method for producing a sensor device. The method includes providing a magnet, mounting a first differential magnetic field sensor on a first surface of the magnet, and mounting a second differential magnetic field sensor on a second surface of the magnet, the second surface being situated opposite the first surface.

BRIEF DESCRIPTION OF THE DRAWINGS

Devices and methods in accordance with the disclosure are explained in greater detail below with reference to drawings. Identical reference signs here may denote identical or similar components. The features of the various examples illustrated can be combined with one another, provided that they are not mutually exclusive, and/or they can be selectively omitted if they are not described as absolutely necessary.

DETAILED DESCRIPTION

Figure 1A:
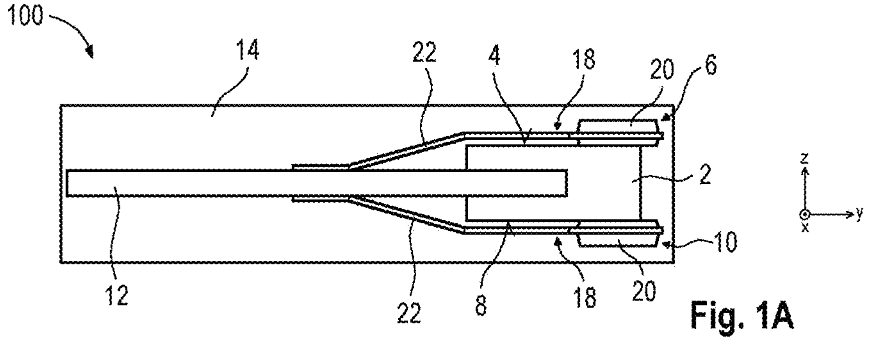
FIGS. 1A to 1D show a side view, a perspective view and two partial views of a sensor device 100 in accordance with the disclosure.
Figure 1B:
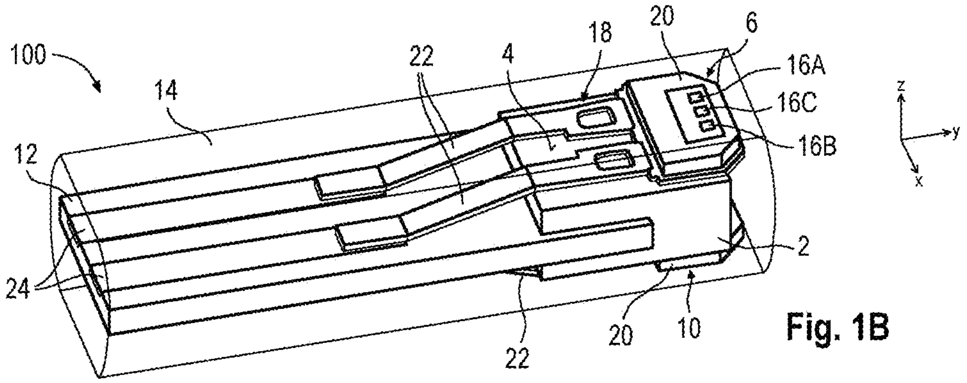
Figure 1C:
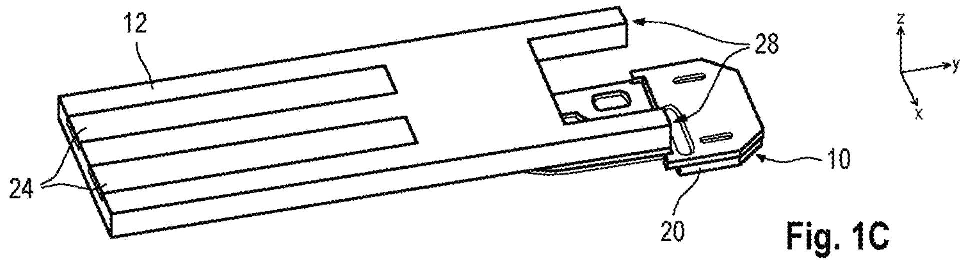
Figure 1D:
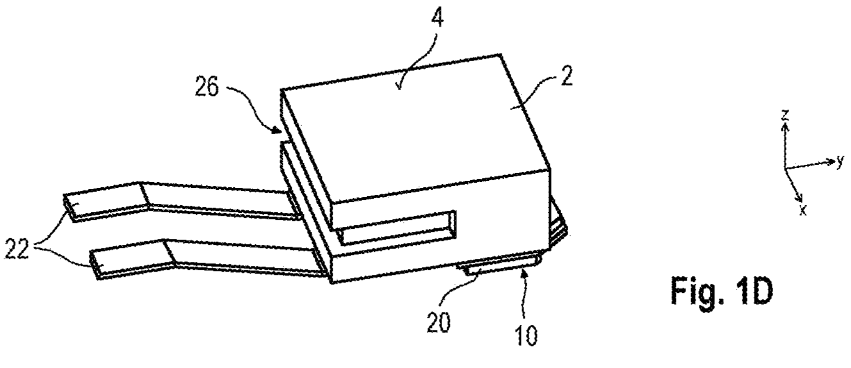

The sensor device 100 in FIG. 1 can contain a magnet 2, a first differential magnetic field sensor 6 mounted on a first surface 4 of the magnet 2, and a second differential magnetic field sensor 10 mounted on a second surface 8 of the magnet 2, the second surface being situated opposite the first surface 4. Furthermore, in the example shown, the sensor device 100 can optionally have a printed circuit board (or a PCB) 12 and a first encapsulation material 14. The magnet 2, the two differential magnetic field sensors 6 and 10 and also the printed circuit board 12 can be at least partly encapsulated by the first encapsulation material 14.

The magnet 2 can be magnetized in the y-direction. In the side view in FIG. 1A, the north pole of the magnet 2 can be arranged on the right and the south pole of the magnet 2 can be arranged on the left, or vice versa. The magnet 2 can be produced from any suitable material. In one example, the magnet 2 can be fabricated from sintered ferrite. The magnet 2 can be configured to provide a magnetic support field for the operation of the sensor device 100. The magnet 2 can be a permanent block magnet, in particular, and so the magnet 2 can be referred to as a permanent back-bias block magnet.

The two differential magnetic field sensors 6 and 10 can be mounted on the opposite surfaces 4 and 8, respectively, of the magnet 2. In this case, the two magnetic field sensors 6 and 10 can be galvanically isolated from one another. The relative arrangement of the magnet 2 and the magnetic field sensors 6 and 10 shown in FIG. 1 can be referred to as a top-read configuration. It is evident from the side view in FIG. 1A that the two differential magnetic field sensors 6 and 10 can be arranged symmetrically relative to the magnet 2 and the printed circuit board 12.

The differential magnetic field sensors 6 and 10 can each be an integrated circuit or a semiconductor chip, such that reference can also be made to differential magnetic field sensor ICs or differential magnetic field sensor chips. Predominantly and by way of example the first differential magnetic field sensor 6 is described hereinafter, in which case corresponding explanations can also be applied to the second differential magnetic field sensor 10. In one example, the two differential magnetic field sensors 6 and 10 can be structurally identical or have an identical or at least similar architecture. In further examples, however, the differential magnetic field sensors 6 and 10 can also differ in at least one feature.

The differential magnetic field sensor 6 can have a first sensor element 16A, a second sensor element 16B and an optional third sensor element 16C lying between the two sensor elements 16A and 16B. In the example shown, the main surfaces of the differential magnetic field sensor 6 can lie in the x-y-plane. The two sensor elements 6A and 6B can be spaced apart from one another in the x-direction, e.g., they can be arranged on a (straight) line running in the x-direction. The third sensor element 16C can likewise be arranged on this line running in the x-direction and in this case can be in particular at an identical distance from the first sensor element 16A and from the second sensor element 16B. In the example shown, in a plan view of the first surface 4, the first sensor element 16A is arranged on the left, the second sensor element 16B is arranged on the right and the third sensor element 16C is arranged in the centre. Therefore, reference can also be made hereinafter to the left, right and central sensor elements.

The sensor elements 16A to 16C can each be configured to detect one or more components of a magnetic field present at the location of the respective sensor element. By way of example, each of the sensor elements 16A to 16C per se can be implemented as a resistor bridge having e.g., four resistors. In one example, the resistors can in this case be arranged in the form of a Wheatstone bridge. The respective sensitivity directions of the sensor elements 16A to 16C can depend on the respective application. Example applications with different sensitivity directions of the sensor elements 16A to 16C are described further below. In one general example, each of the sensor elements 16A to 16C can be sensitive in relation to each of the three spatial directions. That is to say that each of the sensor elements 16A to 16C can be configured to detect the x-, y- and z-components of a magnetic field present at the location of the respective sensor element.

The differential magnetic field sensor 6 or its sensor elements 16A to 16C are not restricted to a specific sensor technology. In one example, the sensor elements 16A to 16C can be magnetoresistive xMR sensor elements, in particular AMR sensor elements, GMR sensor elements or TMR sensor elements. In further examples, the sensor elements 16A to 16C can correspond to Hall sensor elements or fluxgate sensor elements. The sensor elements 16A to 16C can be integrated in a circuit of the chip. Signal amplification, analogue-to-digital conversion, digital signal processing and/or offset and temperature compensation can furthermore be carried out in such a circuit. Besides the components of the respective sensor element, components for the signal amplification and/or the analogue-to-digital conversion may or may not be regarded as part of the sensor elements 16A to 16C.

The differential magnetic field sensor 6 can be mounted on a metal carrier 18, which can be produced from copper, nickel, aluminium or high-grade steel, for example. In one example, the metal carrier 18 can correspond to a leadframe having one or more die pads and one or more connecting conductors (leads or pins) 22. The differential magnetic field sensor 6 can be electrically connected to one or more of the connecting conductors 22. The metal carrier 18 and the differential magnetic field sensor 6 can be at least partly encapsulated in a second encapsulation material 20. The connecting conductors 22 can at least partly project from the second encapsulation material 20, such that the differential magnetic field sensor 6 can be electrically contacted from outside the second encapsulation material 20. The encapsulation materials 14 and 20 can be identical or different and can each be fabricated for example from a laminate, an epoxy resin, a thermoplastic and/or a thermosetting polymer.

The printed circuit board 12 can be regarded as an optional component of the sensor device 100. By way of example, the sensor devices in accordance with the disclosure described further below and shown in FIGS. 2 and 3 need not necessarily have a printed circuit board. The printed circuit board 12 can have one or more conductor tracks 24 in each case on its top side and its underside. In the case shown, by way of example, two linearly running conductor tracks 24 can be arranged on the top side of the printed circuit board 12. In further examples, the number and geometry of the conductor tracks 24 can be chosen differently, depending on the application. The conductor tracks arranged on the underside of the printed circuit board 12 are not discernible in FIGS. 1A to 1D owing to the perspectives chosen. These conductor tracks 12 can be similar to the conductor tracks 24 arranged on the top side of the printed circuit board 12.

The two differential magnetic field sensors 6 and 10 can be electrically connected to the printed circuit board 12. More precisely, the first differential magnetic field sensor 6 can be electrically connected to conductor tracks 24 on the upper surface of the printed circuit board 12 via the connecting conductors 22, and the second differential magnetic field sensor 10 can be electrically connected to conductor tracks 24 on the lower surface of the printed circuit board 12 via the connecting conductors 22. In the example shown, the connecting conductors 12 can be bent around edges of the magnet 2 for this purpose.

The conductor tracks 24 can be electrically connected to external connecting elements (not shown) of the sensor device 100. Via these external connecting elements, the conductor tracks 24 and the connecting conductors 22, it is thus possible to provide an electrical connection between the magnetic field sensors 6 and 10 and an external component (not shown). Such an external component can be a processing unit (or control unit, e.g., ECU), for example, which can be configured to process measurement signals output by the differential magnetic field sensors 6 and 10. In one example, such a processing unit can contain a microcontroller or a processor.

The magnet 2 can have at least one cutout 26. A mechanical connection between the printed circuit board 12 and the magnet 2 can be provided by a printed circuit board section 28 engaging into the at least one cutout 26 of the magnet 2. In the case shown, by way of example, the cutout 26 can correspond to a groove which can extend along three side surfaces of the magnet 2 that adjoin one another. The printed circuit board section 28 can be embodied in forked fashion and have one or more tines which can engage into the groove 26. In the example shown, the forked printed circuit board section 28 can have two laterally arranged tines. In further examples, the printed circuit board section 28 can have three tines or else just a single (in particular) centred tine. In these cases, the magnet 2 can have one or more openings for receiving the tine(s), in order to provide a mechanical connection between the magnet 2 and the printed circuit board 12.

A connection to the printed circuit board sections described can be realized by cost-effective sintered magnets. Furthermore, with plastic-bonded (e.g., polyphenylene sulphide (PPS), polyamides (PA6, PA12)) magnets, it is possible to realize more complex constructions, such as clip-on designs, for example, in which the magnet 2 can have a cutout and the printed circuit board 12 can have a lug-shaped structure capable of latching into the cutout. Plastic-bonded magnets of this type can be produced based on an injection-moulding method, for example. In even further examples, a mechanical connection between the magnet 2 and the printed circuit board 12 can be provided in a simple manner by an adhesive medium or an adhesive.

Figure 2:
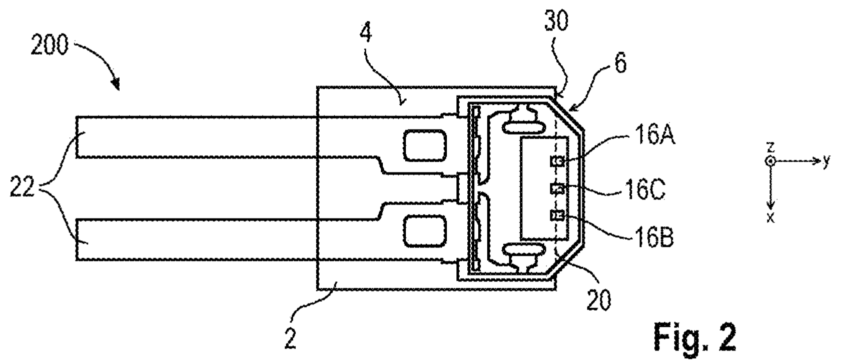
FIG. 2 shows a plan view of a sensor device 200 in accordance with the disclosure.

The sensor device 200 in FIG. 2 can have one or more features of the sensor device 100 in FIG. 1. Only the first differential magnetic field sensor 6 is discernible in the plan view in FIG. 2. In the example shown, the sensor device 200 need not necessarily have the first encapsulation material 14 that encapsulates the magnet 2 and the two differential magnetic field sensors 6 and 10. Furthermore, the sensor device 200 need not necessarily have the printed circuit board 12. In such a case, an electrical connection between the magnetic field sensors 6 and 10 and an external component can be provided directly by way of the connecting conductors 22. Since the sensor device 200 does not have a printed circuit board 12, the magnet 2 need not necessarily have a cutout 26. In the example shown, the magnet 2 can be embodied in parallelepipedal fashion.

In particular, an arrangement of the sensor elements 16A to 16C relative to the magnet 2 is evident from FIG. 2. A first side edge 30 of the magnet 2 running in the x-direction and the sensor elements 16A to 16C of the first differential magnetic field sensor 6 can be at least partly congruent in the plan view of the first surface 4 of the magnet 2 (e.g., as viewed in the z-direction). To put it more precisely, the centres of the sensor elements 16A to 16C and the side edge 30 of the magnet 2 can be arranged congruently with respect to one another as viewed in the z-direction. In this case, the first sensor element 16A and the second sensor element 16B can be in particular at an identical distance from the midpoint of the side edge 30. Analogously, a second side edge of the magnet 2 running in the x-direction and the sensor elements 16A to 16C of the second magnetic field sensor 10 can be at least partly congruent as viewed in the z-direction.

On account of the congruent arrangement described, the sensor elements 16A to 16C can be exposed to low magnetic fields. In particular, the sensor elements 16A to 16C can be exposed to small magnetic offsets, whereby a saturation of the sensor elements 16A to 16C can be avoided or at least reduced. Further signal processing of the signals provided by the two differential magnetic field sensors 6 and 10, or a signal path design implemented for this purpose, can therefore be simplified.

Figure 3A:
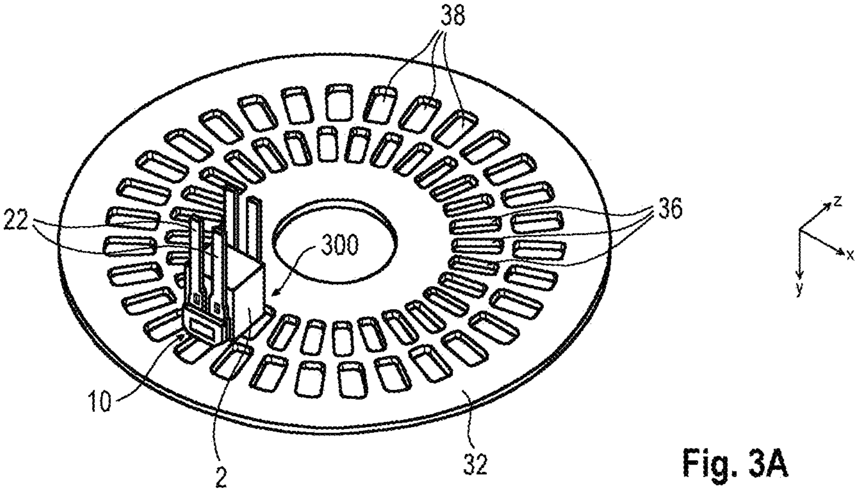
FIGS. 3A and 3B show a perspective view and a plan view of an application of a sensor device 300 in accordance with the disclosure.
Figure 3B:
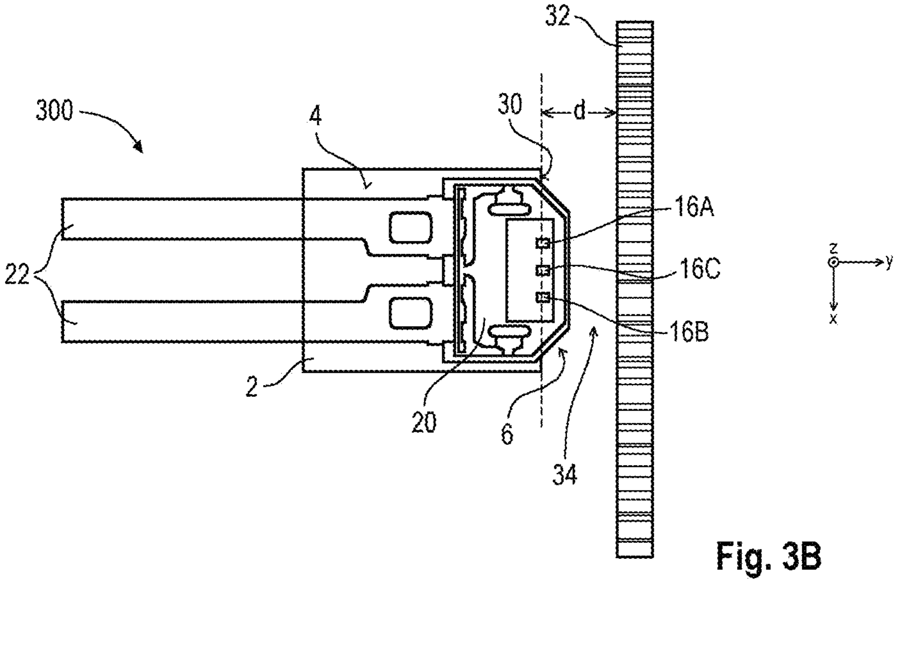

FIGS. 3A and 3B show one possible application of a sensor device 300 in accordance with the disclosure. The sensor device 300 can have one or more properties of sensor devices described above. The sensor device 300 can be arranged relative to a ferromagnetic target structure 32 and can be separated from the latter by an air gap 34. A size of the air gap 34 can be specified for example as distance d between the ferromagnetic target structure 32 and the sensor elements 16A to 16C (or the side edge 30 of the magnet 2) as measured in the y-direction. The ferromagnetic target structure 32 may or may not be regarded as part of the sensor device 300. The ferromagnetic target structures described herein can be fabricated from any suitable ferromagnetic material, such as, for example, a ferromagnetic metal or a ferromagnetic metal alloy. In one specific example, the ferromagnetic target structures can be produced from steel and/or iron.

In the example shown, the ferromagnetic target structure 32 can comprise or correspond to a ferromagnetic wheel. The ferromagnetic wheel 32 can be configured to rotate about an axis of rotation, which can run in the y-direction in the example shown. The sensor device 300 in FIG. 3 can be aligned as already shown in FIGS. 1 and 2, e.g., the magnet 2 can be magnetized in the y-direction (e.g., in the air gap direction), and the sensor elements 16A to 16C of the differential magnetic field sensors 6 and 10 can be spaced apart from one another in the x-direction.

The ferromagnetic wheel 32 can have a first, inner track with a first number N of openings 36 and a second, outer track with a second number M of openings 38. The two tracks can run in circular fashion, wherein the radius of the inner track can be smaller than the radius of the outer track. The first number N and the second number M can differ from one another, wherein the first number N of openings 36 can be in particular one less than the second number M of openings 38, e.g., M=N+1. In the case shown, the following can hold true in a non-limiting manner and by way of example: N=30 and M=31.

The sensor device 300 or its two differential magnetic field sensors 6 and 10 can be arranged offset with respect to the axis of rotation. In this case, the first differential magnetic field sensor 6 can be aligned with the openings 36 of the inner track. To put it more precisely, the sensor elements 16A to 16C can be aligned with the openings 36, such that they at least partly overlap them during a rotation of the ferromagnetic wheel 32 about the axis of rotation. During rotation of the ferromagnetic wheel 32, the openings 36 and the ferromagnetic material arranged between the openings 36 can alternately move past the sensor elements 16A to 16C of the first differential magnetic field sensor 6. The first differential magnetic field sensor 6 can be configured to detect the changing magnetic field at the positions of its sensor elements 16A to 16C. Analogously, the second differential magnetic field sensor 10 can be aligned with the openings 38 of the outer track and can be configured to detect the changing magnetic field at the positions of its sensor elements 16A to 16C.

Each of the two magnetic field sensors 6 and 10 can be configured to output two differential signals. The generation of these differential signals and also the sensitivity directions of the sensor elements 16A to 16C of the respective differential magnetic field sensor that are used in this context can differ depending on the application. Two examples are described below in this context.

In a first example, all three sensor elements 16A to 16C of the differential magnetic field sensors 6 and 10 can be used. In this case, all three sensor elements 16A to 16C of the respective magnetic field sensor can be sensitive in the air gap direction (e.g., in the y-direction). In the case of such a configuration, therefore, all three sensor elements 16A to 16C have the same sensitivity direction, which can simplify a process for the production of the magnetic field sensors.

For example, a corresponding magnetization can be generated in a furnace and in the process a complete wafer can be magnetized in a single step.

A first differential signal $S1_{sine}$ output by the first differential magnetic field sensor 6 can be based on a measurement of its first sensor element 16A and a measurement of its second sensor element 16B. In this context, it can hold true that $$S1_{sine} \sim ByL - ByR \quad (1)$$

wherein the letter "L" denotes a measurement of the first (left) sensor element 16A and the letter "R" denotes a measurement of the second (right) sensor element 16B. A second differential signal $S1_{cosine}$ output by the first magnetic field sensor 6 can be based on measurements of its three sensor elements 16A to 16C. In this context, it can hold true that $$S1_{cosine} \sim ByC - \frac{ByL + ByR}{2} \quad (2)$$

wherein the letter "C" denotes a measurement of the third (central) sensor element 16C. Differential signals $S2_{sine}$ and $S2_{cosine}$ output by the second differential magnetic field sensor 10 can be determined analogously.

In a second example, the first sensor element 16A and the second sensor element 16B of the differential magnetic field sensors 6 and 10 can be used. In this case, the two sensor elements 16A and 16B can be sensitive in the connection direction of the two sensor elements (e.g., in the x-direction) and also in the air gap direction (e.g., in the y-direction). The two sensitivity directions can be generated by a laser magnetization, for example. In this case, a first bridge circuit can be sensitive in the y-direction and a second bridge circuit can be sensitive in the x-direction.

A first differential signal $S1_{sine}$ output by the first differential magnetic field sensor 6 can be based on a measurement of its first sensor element 16A in the y-direction and a measurement of its second sensor element 16B in the y-direction. In this context, it can hold true that $$S1_{sine} \sim ByL - ByR \quad (3)$$

A second differential signal $S1_{cosine}$ output by the first differential magnetic field sensor 6 can be based on a measurement of its first sensor element 16A in the x-direction and a measurement of its second sensor element 16B in the x-direction. In this context, it can hold true that $$S1_{cosine} \sim BxL - BxR \quad (4)$$

The differential signals $S2_{sine}$ and $S2_{cosine}$ output by the second differential magnetic field sensor 10 can be determined analogously.

The differential signals $S1_{sine}$ (and respectively $S2_{sine}$) in accordance with the relations (1) and (3) can each have a sinusoidal profile. Example profiles of such signals are shown and described further below in association with FIGS. 4A and 5A. The differential signals $S1_{cosine}$ (and respectively $S2_{cosine}$) in accordance with the relations (2) and (4) can each have a cosinusoidal profile. Example profiles of such signals are shown and described further below in association with FIGS. 4B and 5B.

The differential signals $S1_{sine}$, $S1_{cosine}$, $S2_{sine}$ and $S2_{cosine}$ provided by the two magnetic field sensors 6 and 10 can be used to determine a position or a rotation angle of the ferromagnetic target structure 32. It is noted in this context that the ferromagnetic target structure 32 can be mechanically coupled to a component, such as a rotatable shaft, for example. Based on the angle or position determination of the ferromagnetic target structure 32, a position or a rotation angle of the component coupled thereto can then be determined as well. One example scheme for determining the rotation angle is described below. The calculations carried out in this context can be provided by a processing unit (or control unit, e.g., ECU) which can contain a microcontroller or a processor, for example. The scheme described below can be carried out both based on differential signals in accordance with the relations (1) and (2) and based on differential signals in accordance with the relations (3) and (4).

Differential signals $S1_{sine}$ and $S1_{cosine}$ provided by the first differential magnetic field sensor 6 can be used to determine a first relative angle $\alpha_{coarse}$. Analogously, differential signals $S2_{sine}$ and $S2_{cosine}$ provided by the second differential magnetic field sensor 10 can be used to determine a second relative angle $\alpha_{fine}$. In this case, the determination of the first relative angle $\alpha_{coarse}$ and of the second relative angle $\alpha_{fine}$ can each be based on an arc-tangent operation. In this context, it can hold true that $$\alpha_{coarse} \sim \arctan\left(\frac{S1_{sine}}{S1_{cosine}}\right) \quad (5)$$

and $$\alpha_{fine} \sim \arctan\left(\frac{S2_{sine}}{S2_{cosine}}\right) \quad (6)$$

Example profiles of the relative angles $\alpha_{coarse}$ and $\alpha_{fine}$ are shown and described further below in association with FIGS. 6A and 6B. It is noted that the differential signals can be normalized before the arc-tangent operation and the normalized signals can be used as input for the arc-tangent operation. A normalization can contain an offset and/or amplitude correction.

The relative angles $\alpha_{coarse}$ and $\alpha_{fine}$ can be used to determine an (absolute) rotation angle (or nonius angle) $\alpha_{nonius}$ of the ferromagnetic target structure 32. In this case, determining the nonius angle $\alpha_{nonius}$ can be based on a nonius operation. In this context, it can hold true that $$\alpha_{nonius} = \alpha_{fine} - \alpha_{coarse} \quad (7)$$

An example profile of the nonius angle $\alpha_{nonius}$ is shown and described further below in association with FIG. 8A.

The nonius angle $\alpha_{nonius}$ ascertained may have a residual error. Using a further calculation scheme described below, in order to correct overshoots:

$$\alpha_{nonius} = \mathrm{mod}(\alpha_{nonius}, 360). \quad (8)$$

Next, a signal period associated with the outer track with N+1 openings 38 can be determined in accordance with $$\text{Threshold} = \frac{360^\circ}{N+1} \tag{9}$$

and $$\text{Signal period Number} = \left\lfloor \frac{\alpha_{nonius}}{\text{Threshold}} \right\rfloor \tag{10}$$

wherein the floor function (or ⌊•⌋) is used in equation (10).

With knowledge of the signal period, the new and more accurate output angle $\alpha_{new}$ can be calculated in accordance with $$\alpha_{new} = \text{Threshold} \cdot \textit{Signalperiod}\ \text{Number} + \frac{\alpha_{fine}}{N+1} \tag{11}$$

On account of a possible error of the nonius angle $\alpha_{nonius}$ under certain circumstances the correct signal period cannot always be determined correctly. In some cases, the calculated signal period can deviate by one. This can result in high error peaks with an amplitude of +/−Threshold. The error peaks can be removed by comparing the new angle $\alpha_{new}$ with the nonius angle $\alpha_{nonius}$. If a difference between the two angles is greater than a maximum nonius error, the threshold value Threshold can be subtracted from $\alpha_{new}$, e.g., $$\text{IF } \alpha_{nonius} - \alpha_{new} > \max(\text{abs}(\text{Error}_{nonius})) \tag{12}$$

$$\alpha_{new} = \alpha_{new} - \text{Threshold}$$

Conversely, the threshold value Threshold can be added if the difference between the two angles is less than the minimum nonius error, e.g., $$\text{IF } \alpha_{nonius} - \alpha_{new} < -1 \cdot \max(\text{abs}(\text{Error}_{nonius}))\ \alpha_{new} = \alpha_{new} + \text{Threshold} \tag{13}$$

Simulation results of a determination of a position or of a rotation angle of a ferromagnetic target structure based on the scheme described above are shown and described below in association with FIGS. 4 to 9. In this case, the simulations are based on an arrangement as shown in FIGS. 3A and 3B. Furthermore, the simulations are based on the example and non-limiting parameter values indicated below.

A radius of the inner track with the openings 36 has a value of approximately 10 mm and a radius of the outer track with the openings 38 has a value of approximately 27 mm. A thickness of the ferromagnetic wheel 32 in the y-direction has a value of approximately 1 mm. The first differential magnetic field sensor 6 is aligned with the inner track with a reading radius of approximately 14 mm and a number of N=30 openings 36. A distance or pitch between (directly) adjacent openings 36 is approximately 2.93 mm. The second differential magnetic field sensor 10 is aligned with the outer track with a reading radius of approximately 20 mm and N=31 openings 38. A distance or pitch between (directly) adjacent openings 38 is approximately 4.05 mm. A width of the openings is somewhat larger than a width of the ferromagnetic material situated between the openings. An associated graduation ratio has a value of approximately 0.4. The back-bias magnet 2 is a sintered ferrite block magnet embodied in parallelepipedal fashion and having approximate dimensions (x, y, z)=(6, 7, 5) mm. A remanence Br of the magnet 2 has a value of approximately 410 mT and a coercive field strength Hcj of the magnet 2 has a value of approximately 271 kA/m.

In the simulations, the sensor elements 16A to 16C are modelled as 3 sensitive regions on the left (sensor element 16A), in the centre (sensor element 16C) and on the right (sensor element 16B). The distance between the left sensor element 16A or the left region and the right sensor element 16B or the right region is approximately 1.546 mm. In real applications, the sensitive region may not be a single sensitive region, rather the region can consist of TMR sensor elements which can be connected in the form of a Wheatstone bridge. The bridge circuit can be either a spatially distributed bridge circuit (e.g., with two e.g., TMRs on the left-hand side and the other two e.g., TMRs on the right-hand side) or a double differential full-bridge circuit (e.g., a Wheatstone full bridge on the left-hand side and a further bridge on the right-hand side).

The simulations are based on two spatially distributed bridges which are modelled by the left and right sensitive regions. One bridge circuit is sensitive to magnetic fields in the x-direction, while the other bridge circuit is sensitive to magnetic fields in the y-direction. In this way, each of the two differential magnetic field sensors 6 and 10 can provide two differential signals. One of the two differential signals can be representative of the Bx fields, while the other differential signal can be representative of the By fields.

Figure 4A:
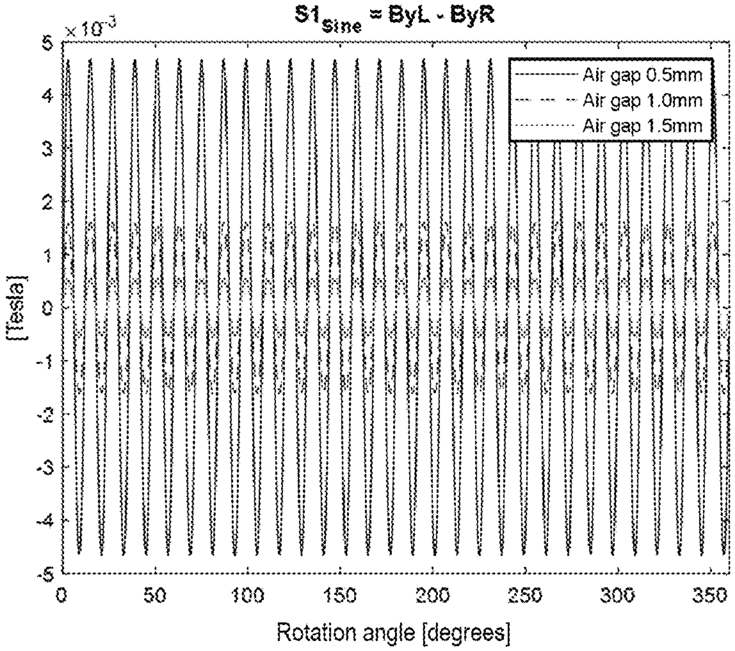
FIGS. 4A and 4B show profiles of output signals of a first differential magnetic field sensor of a sensor device in accordance with the disclosure.
Figure 4B:
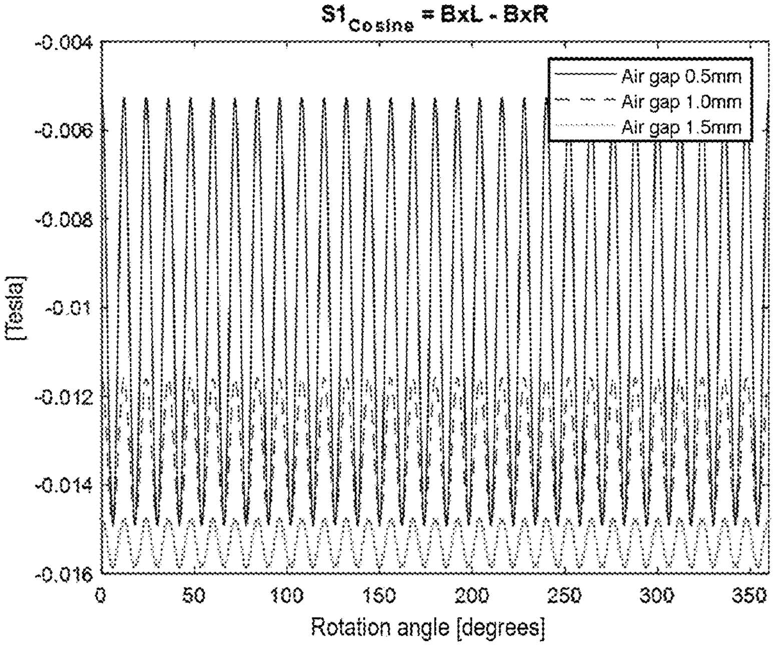

FIGS. 4A and 4B show example simulated profiles of the output signals $S1_{sine}$ and respectively $S1_{cosine}$ of the first differential magnetic field sensor 6. The signal profiles are based on the relations (3) and (4) and are shown for different air gap sizes of 0.5 mm, 1.0 mm and 1.5 mm. In this case, the signal strengths are plotted against the rotation angle of the ferromagnetic wheel 32. The signal profiles for a full revolution of the ferromagnetic wheel 32 through 360 degrees are shown. FIG. 4A shows sinusoidal profiles of the differential signal $S1_{sine}$ with a number of 30 oscillations, while FIG. 4B shows cosinusoidal profiles of the differential signal $S1_{cosine}$ with a number of 30 oscillations.

Figure 5A:
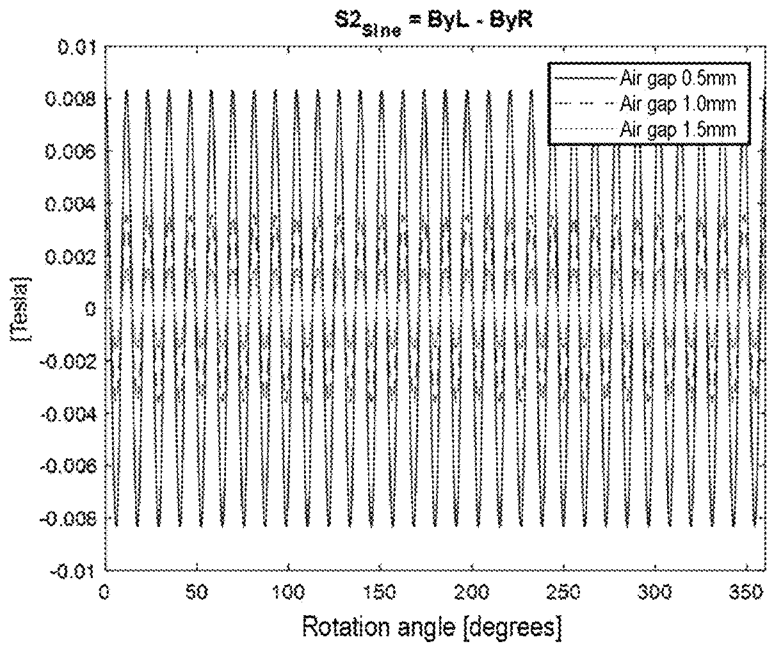
FIGS. 5A and 5B show profiles of output signals of a second differential magnetic field sensor of a sensor device in accordance with the disclosure.
Figure 5B:
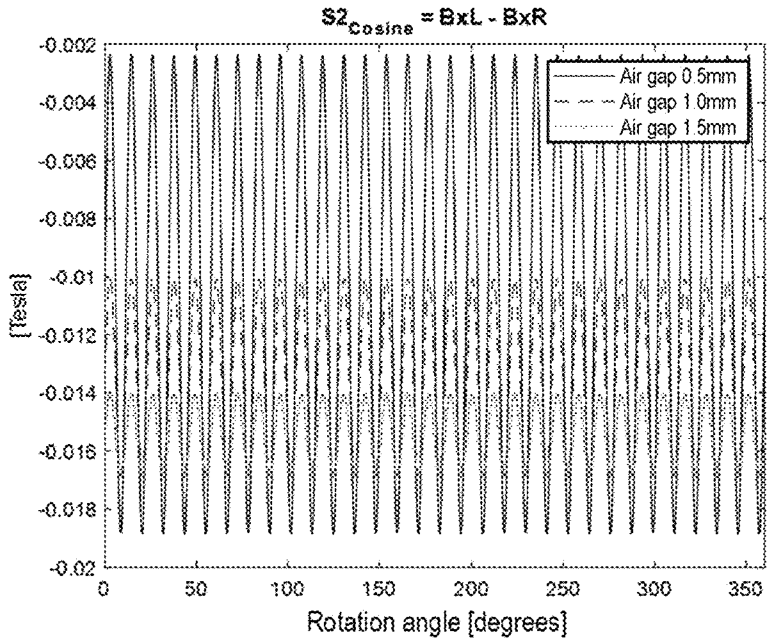

Analogously, FIGS. 5A and 5B show example simulated profiles of the output signals $S2_{sine}$ and respectively $S2_{cosine}$ of the second differential magnetic field sensor 10. The signal profiles are based on the relations (3) and (4) and are shown for different air gap sizes of 0.5 mm, 1.0 mm and 1.5 mm. FIG. 5A shows sinusoidal profiles of the differential signal $S2_{sine}$ with a number of 31 oscillations, while FIG. 5B shows cosinusoidal profiles of the differential signal $S2_{cosine}$ with a number of 31 oscillations.

Figure 6A:
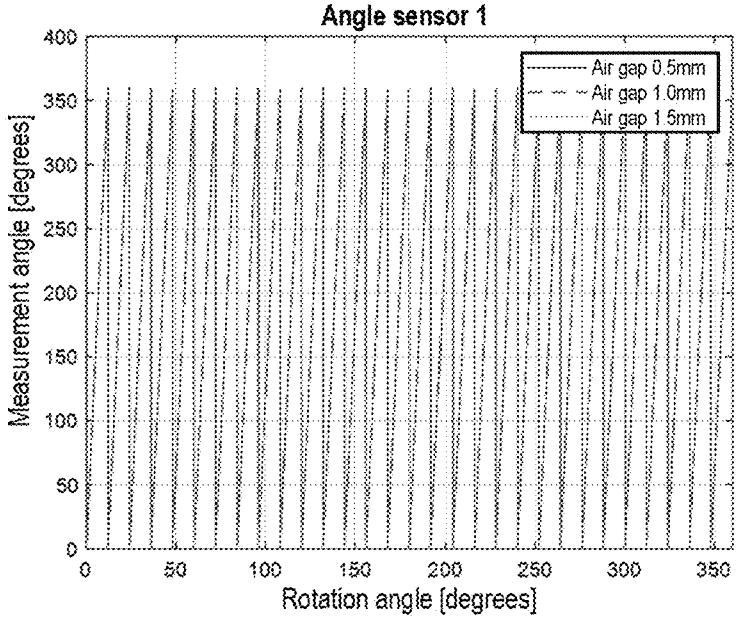
FIGS. 6A and 6B show profiles of relative angles which were determined based on the output signals in FIGS. 4 and 5.

FIG. 6A shows example simulated profiles of a relative angle $\alpha_{coarse}$ based on the output signals $S1_{sine}$ and $S1_{cosine}$ of the first differential magnetic field sensor 6. In this case, the signal profiles are based on equation (5). In a preceding step, the differential signals $S1_{sine}$ and $S1_{cosine}$ can be normalized (offset and amplitude correction) and used as input for the arc-tangent operation. The determined angle $\alpha_{coarse}$ is plotted against the rotation angle of the ferromagnetic wheel 32. The profile of the relative angle $\alpha_{coarse}$ for a full revolution of the ferromagnetic wheel 32 through 360 degrees is shown. The signal profiles shown each provide relative position information. In the course of a full revolution of the ferromagnetic wheel 32, the signal profiles have N=30 periods.

Figure 6B:
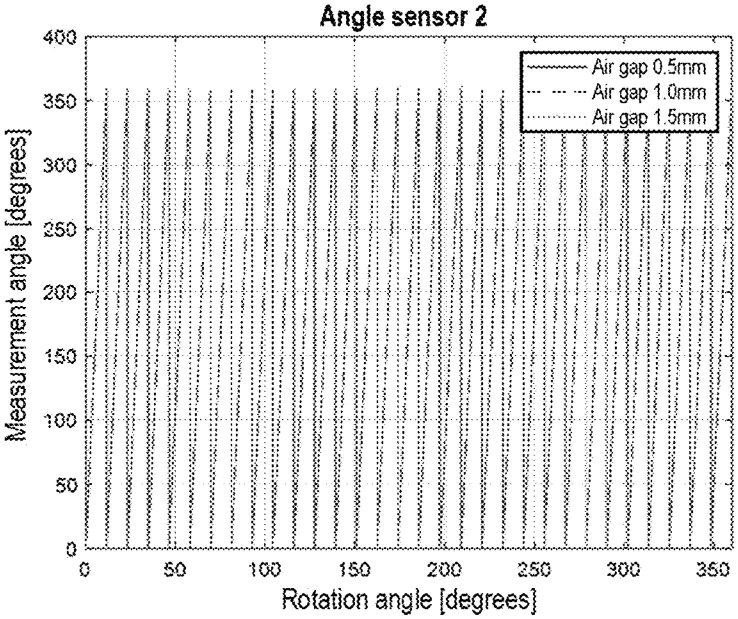

FIG. 6B shows example simulated profiles of a relative angle $\alpha_{fine}$ based on the output signals $S2_{sine}$ and $S2_{cosine}$ of the second differential magnetic field sensor 10. In this case, the signal profiles are based on equation (6). In a preceding step, the differential signals $S2_{sine}$ and $S2_{cosine}$ can be normalized (offset and amplitude correction) and used as input for the arc-tangent operation. The determined angle $\alpha_{fine}$ is plotted against the rotation angle of the ferromagnetic wheel 32. Profiles of the relative angle $\alpha_{fine}$ for a full revolution of the ferromagnetic wheel 32 through 360 degrees are shown. The signal profiles shown each represent relative position information. In the course of a full revolution of the ferromagnetic wheel 32, the signal profiles have N+1=31 periods.

Figure 7A:
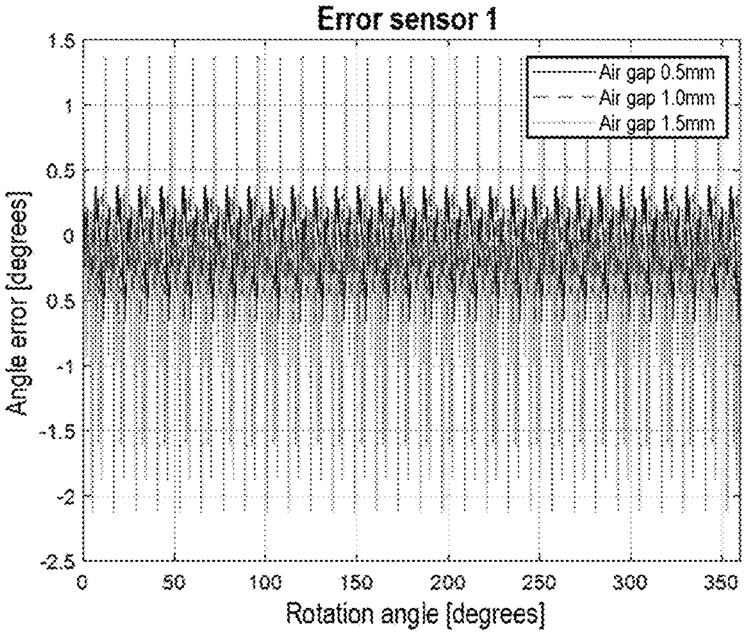
FIGS. 7A and 7B show error profiles of the relative angles shown in FIG. 6.
Figure 7B:
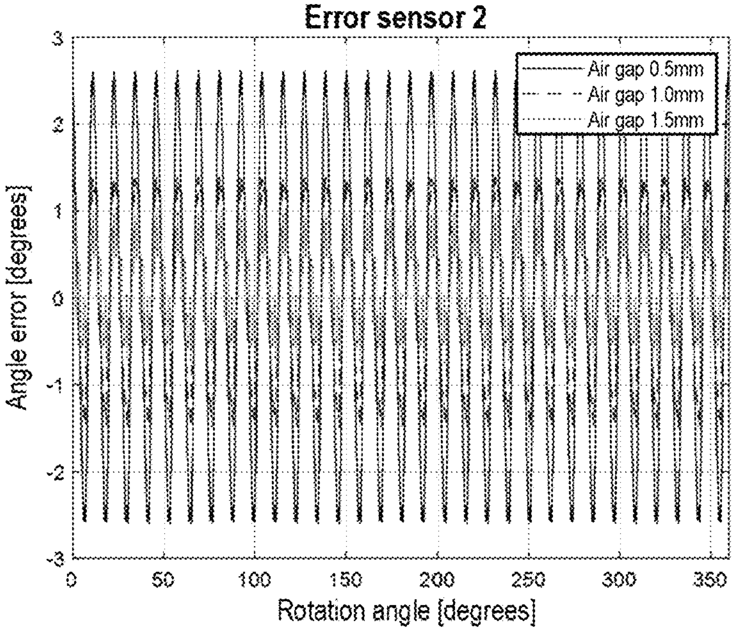

FIGS. 7A and 7B show error profiles of the relative angles shown in FIGS. 6A and 6B, respectively. In this case, FIG. 7A shows the error profile of the relative angle $\alpha_{coarse}$ and FIG. 7B shows the error profile of the relative angle $\alpha_{fine}$ over a full revolution of the ferromagnetic wheel 32.

Figure 8A:
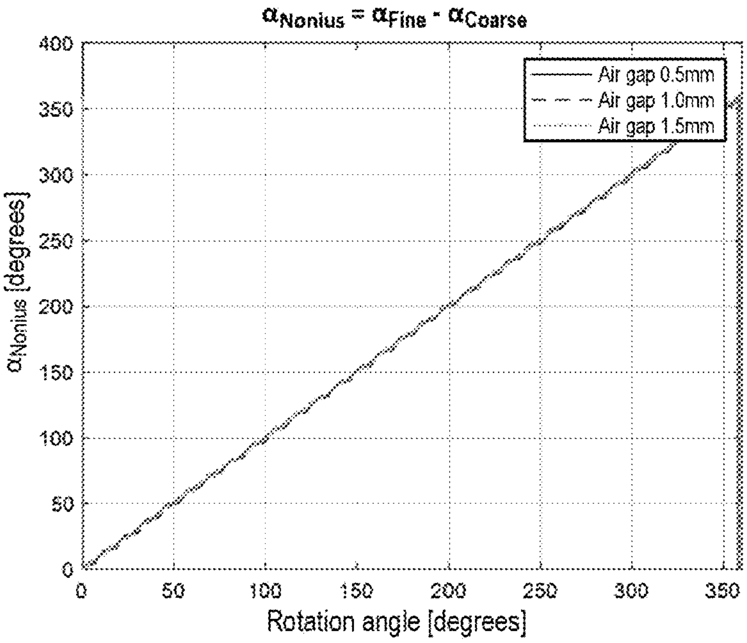
FIGS. 8A and 8B show profiles of a nonius angle and the error thereof which were determined based on the relative angles in FIG. 6 and a first nonius operation.

FIG. 8A shows example simulated profiles of the relative nonius angle $\alpha_{nonius}$ based on the relative angles $\alpha_{coarse}$ and $\alpha_{fine}$. The angle profiles shown are based on the nonius operation of equation (7) and provide absolute angle information.

Figure 8B:
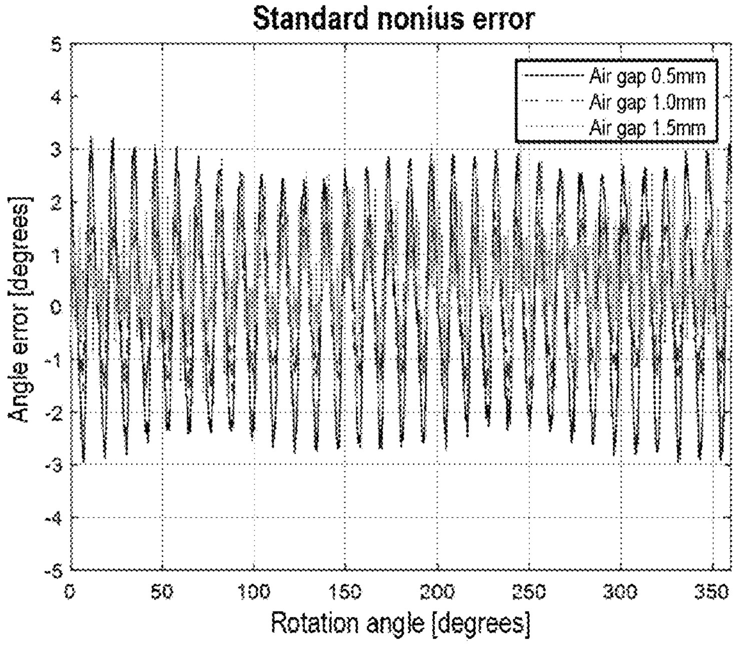

FIG. 8B shows example error profiles of the nonius angle $\alpha_{nonius}$ from FIG. 8A. FIG. 8B reveals that the angle error can be in a range of approximately ±3 degrees.

Figure 9A:
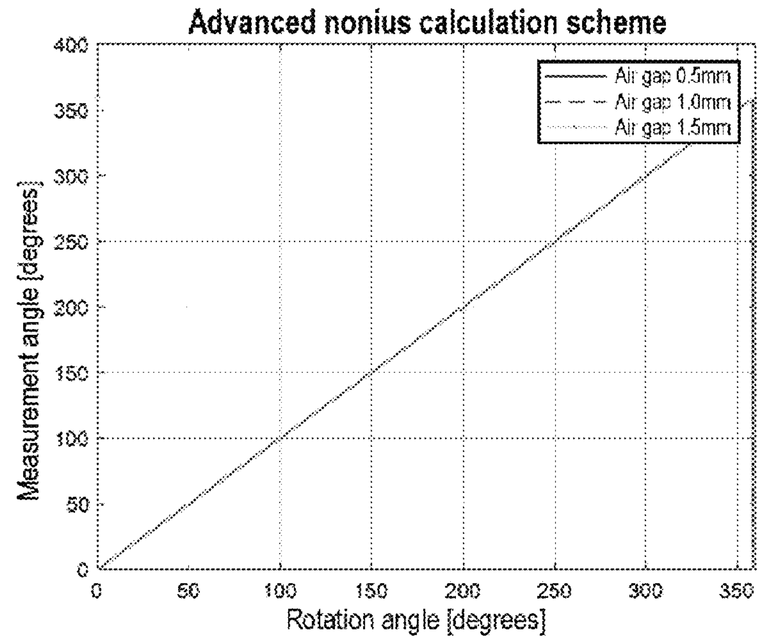
FIGS. 9A and 9B show profiles of a nonius angle and the error thereof which were determined based on the relative angles in FIG. 6 and a second nonius operation.

FIG. 9A shows example simulated profiles of a modified nonius angle $\alpha_{new}$ with a reduced angle error. The angle profiles shown are based on the advanced calculation scheme in accordance with equations (8) to (13).

Figure 9B:
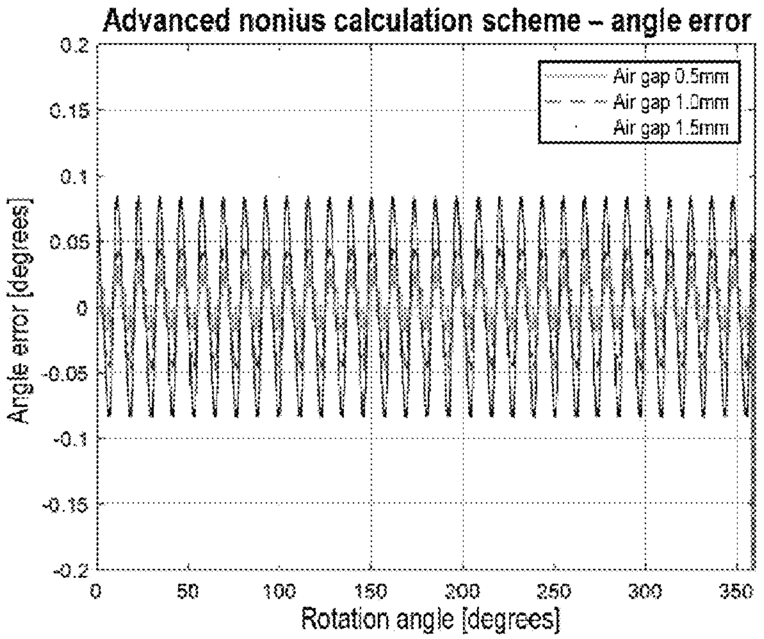

FIG. 9B shows example error profiles of the modified nonius angle $\alpha_{new}$ from FIG. 9A. It is evident from FIG. 9B that the angle error can be in a range of approximately ±0.1 degree and can thus be significantly less than in FIG. 8B. It is noted in this context that a measurement accuracy of the application can be improved by adapting and optimizing the geometric shape of the ferromagnetic target structure (e.g., its graduation and the associated graduation ratio) to the respective sensor device. An important optimization parameter can be a low RMSE (Root Mean Squared Error) deviation when the normalized differential sensor signals are compared with ideal sine and cosine signals.

Figure 10:
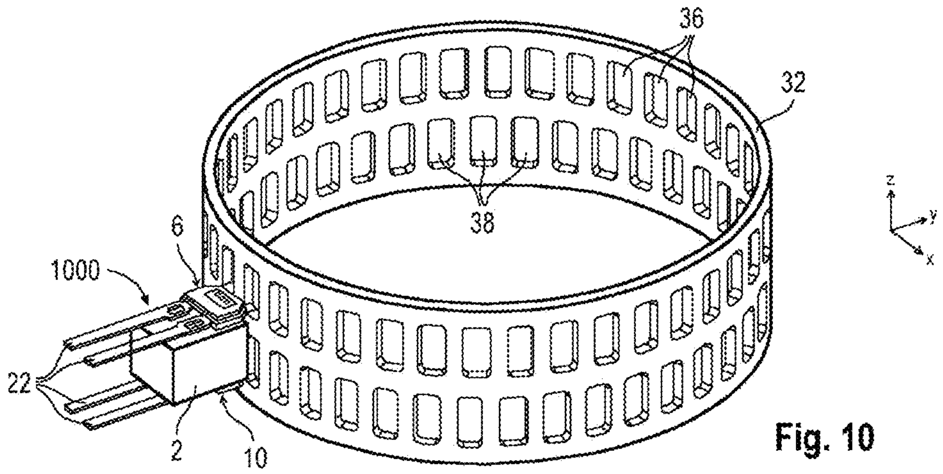
FIG. 10 shows a perspective view of an application of a sensor device 1000 in accordance with the disclosure.

FIG. 10 shows a further possible application of a sensor device 1000 in accordance with the disclosure. The sensor device 1000 can have one or more properties of sensor devices described above. The sensor device 1000 can be arranged relative to a ferromagnetic target structure 32 and can be separated from the latter by an air gap. The ferromagnetic target structure 32 may or may not be regarded as part of the sensor device 1000. In one example, the sensor device 1000 can be identical or similar to the sensor device 300 in FIG. 3. In this case, the arrangements in FIGS. 3 and 10 can differ from one another in the implementation of the ferromagnetic target structure 32. In the example shown, the ferromagnetic target structure 32 can correspond to a ferromagnetic wheel which can rotate about an axis of rotation running in the z-direction. The sensor device 1000 can be aligned analogously to examples described above, e.g., the magnet 2 can be magnetized in the y-direction, and the sensor elements of the differential magnetic field sensors 6 and 10 can each be spaced apart from one another in the x-direction.

The ferromagnetic wheel 32 can have a first, upper track with a first number N of openings 36 and a second, lower track with a second number M of openings 38. Each of the two tracks can have a circular shape. The first number N and the second number M can differ from one another, wherein the first number N of openings can be in particular one less than the second number M of openings, e.g., M=N+1. In the case shown, the following can hold true in a non-limiting manner and by way of example: N=40 and M=41.

The first differential magnetic field sensor 6 can be aligned with the openings 36 of the upper track and the second differential magnetic field sensor 10 can be aligned with the openings 38 of the lower track. During a rotation of the ferromagnetic wheel 32 about its axis of rotation, the openings 36 and 38 can move past the sensor elements 16A to 16C of the first magnetic field sensor 6 and of the second magnetic field sensor 10, respectively. The magnetic field sensors 6 and 10 are each configured to detect the magnetic field that changes at the positions of the respective sensor elements 16A to 16C during a rotation of the ferromagnetic wheel 32.

Each of the two differential magnetic field sensors 6 and 10 can be configured to output two differential signals. Analogously to the example in FIG. 3, the sensor device 1000 can have a processing unit or control unit (e.g., ECU) (not shown) which can be configured to receive the differential signals output from the magnetic field sensors 6 and 10 and to determine a first and a second relative angle on the basis thereof. The processing unit can furthermore be configured to determine a position or a rotation angle of the ferromagnetic wheel 32 from the first and second relative angles. In this case, the variables mentioned can be determined as already described in association with FIG. 3. For the sake of simplicity, reference is made to the description of FIG. 3 in this regard.

Figure 11:
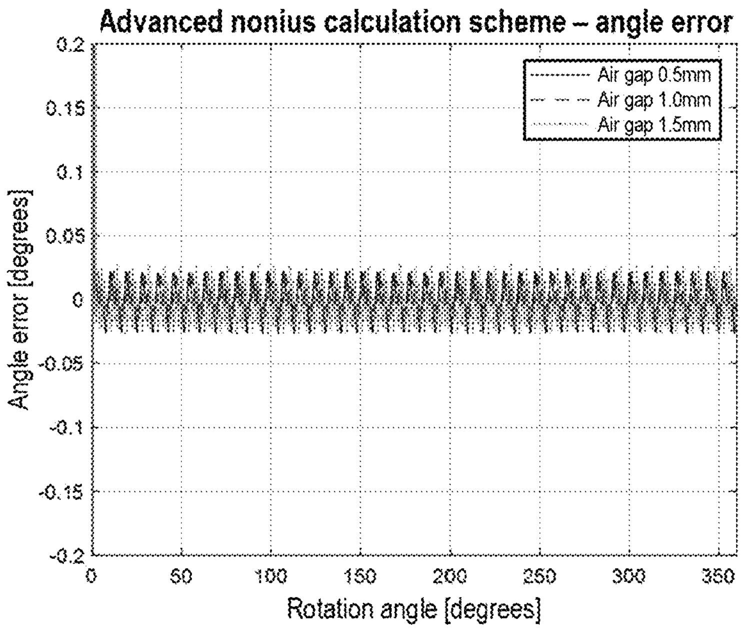
FIG. 11 shows error profiles of a nonius angle.

FIG. 11 shows example simulated error profiles of a modified nonius angle $\alpha_{new}$ for the arrangement shown in FIG. 10. The simulation results shown are based on the advanced calculation scheme of equations (8) to (13). It is evident from FIG. 11 that the angle error can be in a range of approximately ±0.03 degree.

Figure 12:
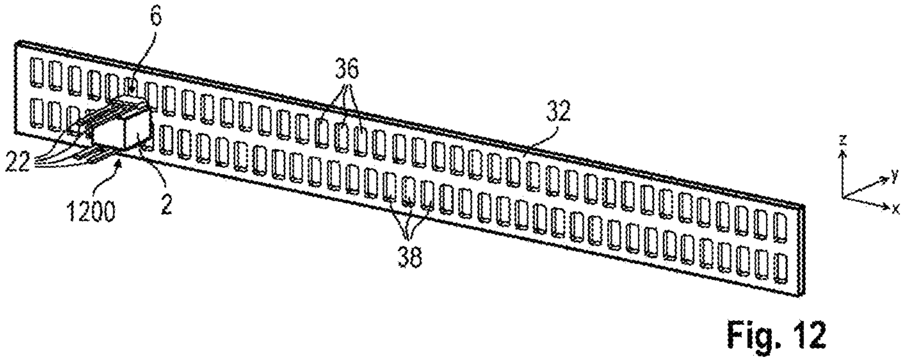
FIG. 12 shows a perspective view of an application of a sensor device 1200 in accordance with the disclosure.

FIG. 12 shows a further possible application of a sensor device 1200 in accordance with the disclosure. The sensor device 1200 can have one or more properties of sensor devices described above. By way of example, the sensor device 1200 can be identical or similar to one of the sensor devices 300 and 1000 in FIGS. 3 and 10, respectively. The sensor device 1200 can be arranged relative to a ferromagnetic target structure 32 and can be separated from the latter by an air gap. The ferromagnetic target structure 32 may or may not be regarded as part of the sensor device 1200. In the example shown, the ferromagnetic target structure 32 can correspond to a linear ferromagnetic structure which can be configured to move past the two magnetic field sensors 6 and 10 in the x-direction. The sensor device 1200 can be aligned analogously to previous examples, e.g., the magnet 2 can be magnetized in the y-direction, and the sensor elements of the differential magnetic field sensors 6 and 10 can be spaced apart from one another in the x-direction.

The ferromagnetic target structure 32 can have a first, upper track with a first number N of openings 36 and a second, lower track with a second number M of openings 38. The two tracks can extend linearly along the x-direction. The first number N and the second number M can differ from one another, wherein the first number N of openings can be in particular one less than the second number M of openings, e.g., M=N+1. In the case shown, the following can hold true in a non-limiting manner and by way of example: N=40 and M=41.

The sensor device 1200 can generate signals and determine variables similar to those generated and determined by the above-described sensor devices in accordance with the disclosure. For the sake of simplicity, in this regard, reference is made to the description of previous examples, in particular to the description of FIG. 3.

Figure 13:
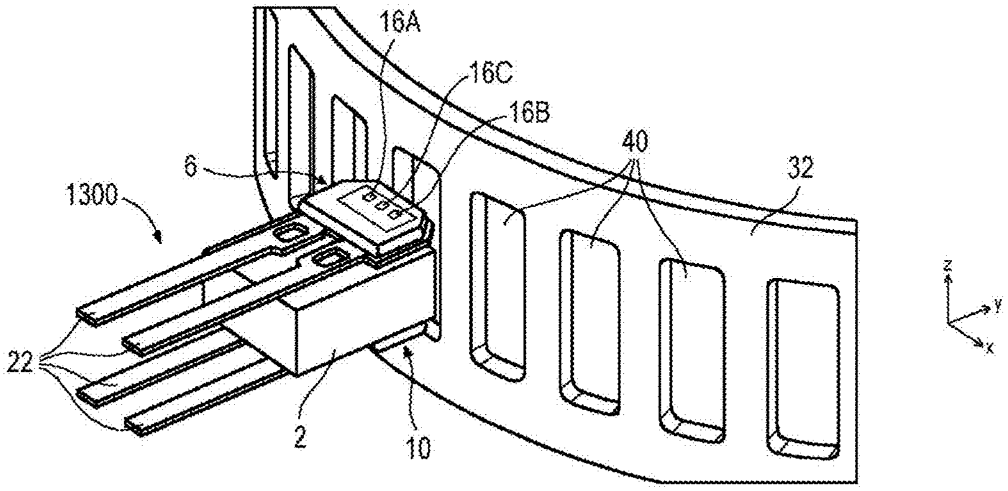
FIG. 13 shows a perspective view of an application of a sensor device 1300 in accordance with the disclosure.

FIG. 13 shows a further possible application of a sensor device 1300 in accordance with the disclosure. The sensor device 1300 can have one or more properties of sensor devices described above. The sensor device 1300 can be arranged relative to a ferromagnetic target structure 32 and can be separated from the latter by an air gap. The ferromagnetic target structure 32 may or may not be regarded as part of the sensor device 1300. The sensor device 1300 for example can be identical or similar to the sensor device 300 in FIG. 3. In this case, the arrangements in FIGS. 3 and 13 can differ from one another in the implementation of the ferromagnetic target structure 32. In the example shown, the ferromagnetic target structure 32 can correspond to a ferromagnetic wheel which can rotate about an axis of rotation running in the z-direction. Only part of the ferromagnetic wheel 32 is illustrated in FIG. 13. The sensor device 1300 can be aligned analogously to previous examples, e.g., the magnet 2 can be magnetized in the y-direction, and the sensor elements of the differential magnetic field sensors 6 and 10 can each be spaced apart from one another in the x-direction.

The ferromagnetic wheel 32 can have a single circular track of openings 40. The number of openings 40 can be chosen depending on the application and can correspond for example to one of the values N or M mentioned in connection with previous examples. The two differential magnetic field sensors 6 and 10 can both be aligned with the single track of openings 40. During a rotation of the ferromagnetic wheel 32 about its axis of rotation, the openings 40 can move past the sensor elements 16A to 16C of the two differential magnetic field sensors 6 and 10. The magnetic field sensors 6 and 10 can each be configured to detect the magnetic field that changes at the positions of the respective sensor elements 16A to 16C during the rotation of the ferromagnetic wheel 32. Each of the two differential magnetic field sensors 6 and 10 can be configured to output two differential signals, as already described in association with FIG. 3. In one example, the differential signals output by the magnetic field sensors 6 and 10 can be based on the relations (1) and (2).

A description is given below, in association with FIGS. 14A to 15B, of simulation results of a determination of a wheel speed or a rotational speed of a ferromagnetic wheel as shown by way of example in FIG. 13. In this case, the simulation results are based on the relations (1) and (2) and the example and non-limiting parameter values indicated below.

The ferromagnetic wheel 32 has a radius of approximately 30 mm and a thickness in the z-direction of approximately 1 mm. Furthermore, the ferromagnetic wheel 32 has a track with 40 openings and a distance or pitch between (directly) adjacent openings 40 of approximately 4.7 mm. The ferromagnetic wheel 32 is fabricated from iron and has a relative permeability $\mu_r$ of approximately 4000. The back-bias magnet 2 is a sintered ferrite block magnet embodied in parallelepipedal fashion and having approximate dimensions of approximately (x, y, z)=(6, 7, 5) mm. A remanence Br of the magnet 2 has a value of approximately 410 mT and a coercive field strength Hcj of the magnet 2 has a value of approximately 271 kA/m. In the simulations, the sensor elements 16A to 16C are modelled as 3 sensitive regions on the left (cf. sensor element 16A), in the centre (cf. sensor element 16C) and on the right (cf. sensor element 16B). The distance between the left sensor element 16A or the left region and the right sensor element 16B or the right region is approximately 1.546 mm.

Figure 14A:
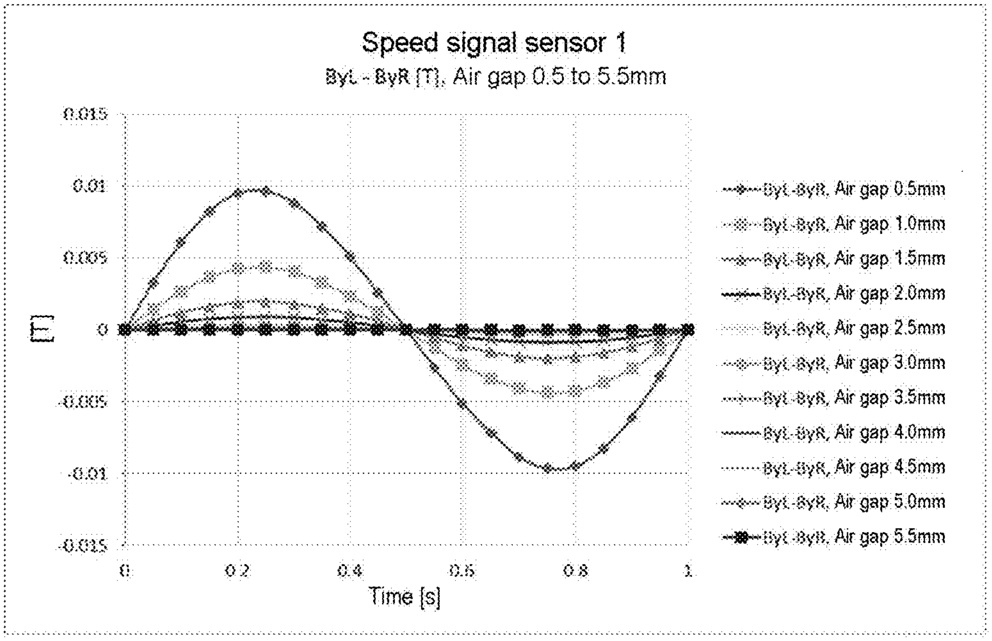
FIGS. 14A and 14B show profiles of output signals of a first differential magnetic field sensor of a sensor device in accordance with the disclosure.
Figure 14B:
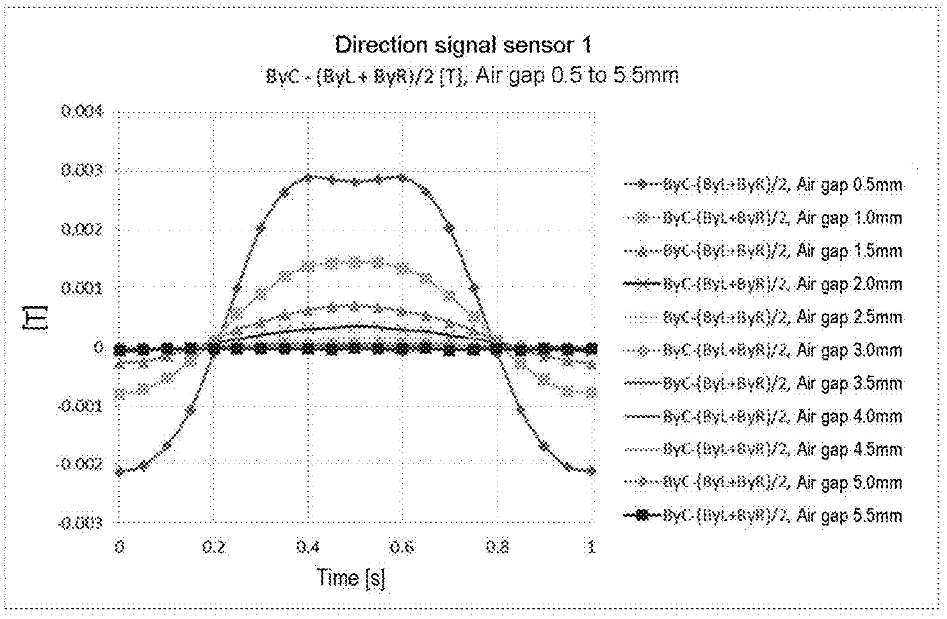

FIGS. 14A and 14B show example simulated profiles of output signals of the first differential magnetic field sensor 6 in accordance with the relations (1) and respectively (2) for different air gap sizes. In this case, FIG. 14A shows a sinusoidal profile of the output signal based on the relation (1). In the course of a full revolution of the ferromagnetic wheel 32 through 360 degrees, the sinusoidal signal profile can have 40 oscillations. In the example shown, only a single oscillation is shown for the sake of simplicity. It is evident from FIG. 14A that the signal strength decreases as the air gap size increases. FIG. 14B shows signal profiles which are based on the relation (2) and from which the direction of rotation of the ferromagnetic wheel 32 can be determined.

Figure 15A:
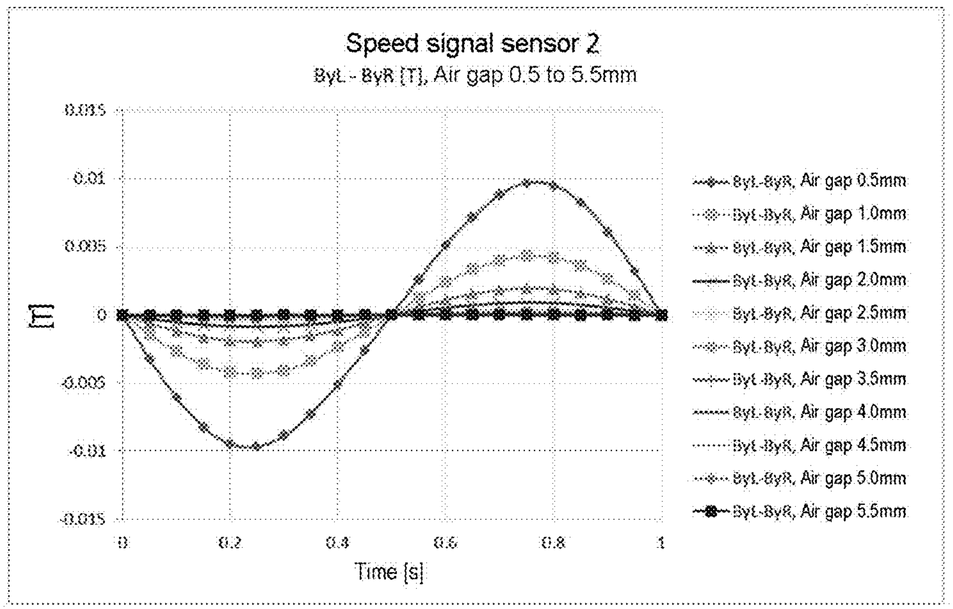
FIGS. 15A and 15B show profiles of output signals of a second differential magnetic field sensor of a sensor device in accordance with the disclosure.
Figure 15B:
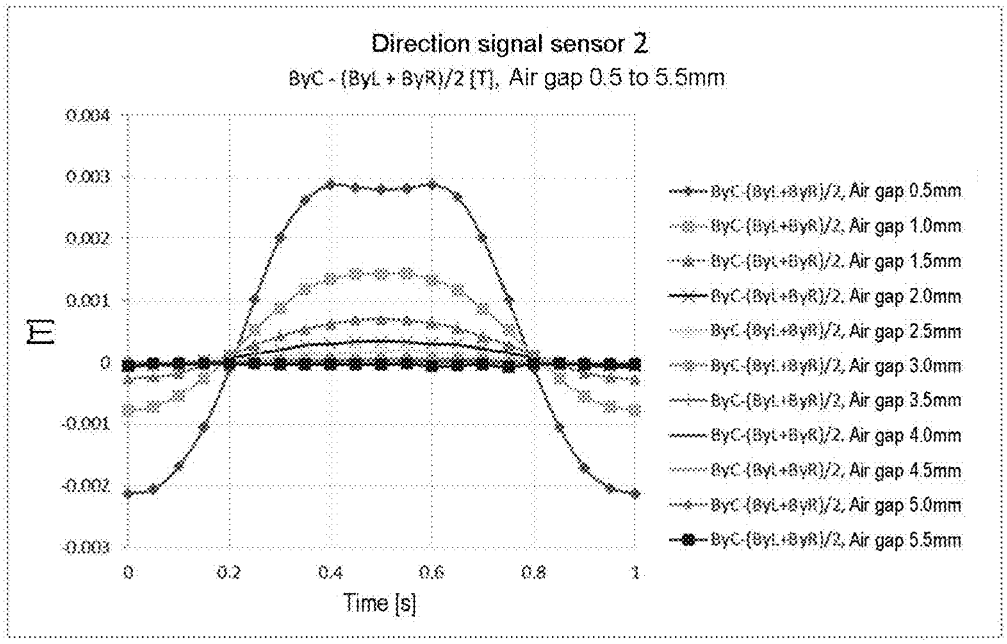

FIGS. 15A and 15B show example simulated profiles of output signals of the second differential magnetic field sensor 10 in accordance with the relations (1) and respectively (2) for different air gap sizes. It is evident from the signal profiles in FIG. 15A that the second differential magnetic field sensor 10 provides the same information as the first differential sensor 6, although shifted by a phase of 180 degrees (or inverted). This may be due in particular to the fact that the sensor elements 16A and 16B of the two magnetic field sensors 6 and 10 can be interchanged in a plan view of the surfaces 4 and 8 of the magnet 2 (that is to say as viewed in the z-direction). In this case, in the plan view, the first sensor element 16A of the first magnetic field sensor 6 can be congruent with the second sensor element 16B of the second magnetic field sensor 10, and the second sensor element 16B of the first magnetic field sensor 6 can be congruent with the first sensor element 16A of the second magnetic field sensor 10.

Identical output information of the two magnetic field sensors 6 and 10 can be provided in various ways based on the inverted output signals. In one example, by way of e.g., an EEPROM (Electrically Erasable Programmable Read-Only Memory) bit, one of the two output signals can be switched over from a rising edge to a falling edge, whereby this signal can be inverted. In a further example, one of the two magnetic field sensors 6 and 10 can be realized with a reference magnetization of the sensor elements 16A and 16B (e.g., TMR elements) that is rotated by 180 degrees. In yet another example, one of the two magnetic field sensors 6 and 10 can be secured to the magnet 2 by its front side instead of by its rear side, e.g., the sensor can be mounted upside down. In this case, the first sensor elements 16A and the second sensor elements 16B of the two magnetic field sensors 6 and 10 would then each be congruent as viewed in the z-direction.

The simulated signal profiles in FIG. 15B can be identical or similar to the simulated signal profiles in FIG. 14B. The two differential magnetic field sensors 6 and 10 can accordingly provide identical information in relation to the present direction of rotation of the ferromagnetic wheel 32.

Analogously to examples described above, the sensor device 1300 can contain a processing unit (or control unit, e.g., ECU) which can contain or correspond to a microcontroller or processor, for example. The processing unit can be configured to determine a speed of the ferromagnetic wheel 32 based on the differential signals output by the two differential magnetic field sensors 6 and 10. In this context, the processing unit can count the oscillations or pulses of the output signals shown in FIGS. 14A and 15A and can ascertain therefrom the rotational speed of the rotating ferromagnetic wheel 32.

As described, the sensor device 1300 in FIG. 13 can be configured to provide two identical and thus redundant output signals, from which the rotational speed of the ferromagnetic wheel 32 can be determined. The sensor device 1300 can be used for example in automotive applications for determining wheel speeds, in particular in safety-relevant applications, such as e.g., ABS (anti-lock braking system), engines or transmissions. In this context, the sensor device 1300 or its processing unit can be configured to carry out an automotive safety check based on the differential signals output by the two differential magnetic field sensors 6 and 10. The two redundant signals can be used for safety plausibility checks at the system level and can provide a high degree of diagnostic coverage in this case. ASIL levels up to ASIL-D can potentially be attained as a result. The sensor device 1300 can be configured in particular to be used as a wheel speed sensor in redundant braking systems which can be prescribed for autonomous driving starting from ADAS (Advanced Driver Assistance System) Level 3 (L3, "Conditional Automation"). In this context, in particular, two wheel speed sensors per wheel may be required.

Figure 16:
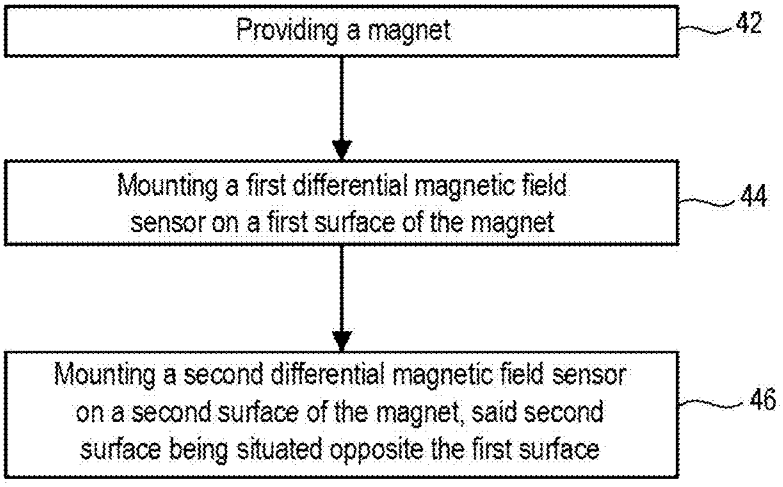
FIG. 16 shows a flow diagram of a method for producing a sensor device in accordance with the disclosure.

FIG. 16 shows a flow diagram of a method for producing a sensor device in accordance with the disclosure. The method can be used for example to produce one of the sensor devices in accordance with the disclosure that are described herein. The method can therefore be read in conjunction with any of the preceding figures.

At 42, a magnet can be provided. At 44, a first differential magnetic field sensor can be mounted on a first surface of the magnet. At 46, a second differential magnetic field sensor can be mounted on a second surface of the magnet, the second surface being situated opposite the first surface.

The technical effects described below can be provided by the sensor devices in accordance with the disclosure that are described herein. On the basis thereof, sensor devices in accordance with the disclosure can surpass conventional sensor devices in various aspects.

Sensor devices in accordance with the disclosure or their applications can use a cost-effective ferromagnetic wheel and a single bias magnet. In contrast thereto, conventional sensor devices may require an expensive encoder wheel with alternating magnetic poles or a ferromagnetic wheel with two bias magnets. Consequently, costs can effectively be saved by a use of the sensor devices described herein.

Sensor devices in accordance with the disclosure are based on a differential measurement principle. For this reason, the applications described herein are insensitive vis-à-vis influences of magnetic stray fields and can thus provide a high measurement accuracy. In this case, the sensor devices are suitable for a multiplicity of applications, for example in automotive, industrial and consumer electronics.

Sensor devices in accordance with the disclosure can have a small form factor. The magnet and the two differential magnetic field sensors can be encapsulated in a single common encapsulation material. In one example, the corresponding sensor package or sensor module can be embodied in cylindrical fashion and can have a comparatively small diameter of approximately 8 mm, for example.

Sensor devices in accordance with the disclosure can be used in a multiplicity of different applications. Example angle measurements for ferromagnetic wheels are described in the examples in FIGS. 3 and 10. Furthermore, the sensor device used in these measurements can also be used for a linear position measurement as shown and described by way of example in association with FIG. 12. In this case, it is merely necessary for the wheel-type ferromagnetic target structure to be replaced by a linear ferromagnetic target structure.

Identical sensor devices in accordance with the disclosure can be used both for position or angle measurements (cf. e.g., FIGS. 3, 10 and 12) and for speed measurements (cf. e.g., FIG. 13).

Sensor devices in accordance with the disclosure offer a simple construction with one magnet and two magnetic field sensors. Necessary calculations for angle determination and/or speed determination can be carried out by an external processing unit (e.g., a microcontroller).

Sensor devices in accordance with the disclosure can be used for a measurement of an absolute position or of an absolute angle. In this context, an "absolute" measurement can mean, in particular, obtaining an unambiguous signal regarding the entire mechanical travel (linear movement or revolution of the ferromagnetic target structure or of a component coupled thereto, such as a shaft, for example).

Sensor devices in accordance with the disclosure can provide redundant measurement signals for determining wheel speeds and can therefore be used for (in particular automotive) safety checks as described in association with FIGS. 13 to 15.

ASPECTS

Sensor devices in accordance with the disclosure and associated production methods are described below based on aspects.

Aspect 1 is a sensor device, comprising: a magnet; a first differential magnetic field sensor mounted on a first surface of the magnet; and a second differential magnetic field sensor mounted on a second surface of the magnet, the second surface being situated opposite the first surface.

Aspect 2 is a sensor device according to Aspect 1, wherein: the magnet is magnetized in a first direction, and each of the two magnetic field sensors has a first sensor element and a second sensor element spaced apart from one another in a second direction perpendicular to the first direction.

Aspect 3 is a sensor device according to Aspect 1 or 2, wherein: the sensor device is arranged relative to a ferromagnetic target structure, and the sensor device and the ferromagnetic target structure are separated from one another by an air gap.

Aspect 4 is a sensor device according to Aspect 3, wherein: the ferromagnetic target structure has a linear ferromagnetic structure configured to move past the two magnetic field sensors in the second direction.

Aspect 5 is a sensor device according to Aspect 3, wherein: the ferromagnetic target structure has a ferromagnetic wheel configured to rotate about an axis of rotation, and the axis of rotation either runs parallel to the first direction or runs in a third direction perpendicular to the first direction and perpendicular to the second direction.

Aspect 6 is a sensor device according to Aspect 5, wherein the two magnetic field sensors are arranged offset with respect to the axis of rotation.

Aspect 7 is a sensor device according to any of Aspects 2 to 6, wherein for each of the two magnetic field sensors it holds true that: the first sensor element and the second sensor element are sensitive in the first direction and in the second direction, a first differential signal output by the magnetic field sensor is based on a measurement of the first sensor element in the first direction and a measurement of the second sensor element in the first direction, and a second differential signal output by the magnetic field sensor is based on a measurement of the first sensor element in the second direction and a measurement of the second sensor element in the second direction.

Aspect 8 is a sensor device according to any of Aspects 2 to 6, wherein: each of the two magnetic field sensors has a third sensor element arranged between the first sensor element and the second sensor element of the respective magnetic field sensor, all three sensor elements of the respective magnetic field sensor are sensitive in the first direction, a first differential signal output by the respective magnetic field sensor is based on a measurement of the first sensor element and a measurement of the second sensor element, and a second differential signal output by the respective magnetic field sensor is based on measurements of all three sensor elements.

Aspect 9 is a sensor device according to any of Aspects 3 to 8, wherein: the ferromagnetic target structure has a first track with a first number of openings and a second track with a second number of openings, the first number and the second number are different from one another, and the first magnetic field sensor is aligned with the first track and the second magnetic field sensor is aligned with the second track.

Aspect 10 is a sensor device according to Aspect 9, wherein the first number of openings is one less than the second number of openings.

Aspect 11 is a sensor device according to any of Aspects 7 to 10, furthermore comprising: a processing unit configured: to receive the first differential signal and the second differential signal of each magnetic field sensor, to determine a first relative angle based on the two differential signals of the first magnetic field sensor, and to determine a second relative angle based on the two differential signals of the second magnetic field sensor.

Aspect 12 is a sensor device according to Aspect 11, wherein determining the first relative angle and determining the second relative angle are each based on an arc-tangent operation.

Aspect 13 is a sensor device according to Aspect 11 or 12, wherein the processing unit is configured to determine a rotation angle of the ferromagnetic target structure based on the first relative angle and the second relative angle.

Aspect 14 is a sensor device according to Aspect 13, wherein determining the rotation angle is based on a nonius operation.

Aspect 15 is a sensor device according to any of Aspects 3 to 8, wherein: the ferromagnetic target structure has a single track of openings, and both magnetic field sensors are aligned with the single track of openings.

Aspect 16 is a sensor device according to Aspect 15, furthermore comprising: a processing unit configured to determine a speed of the ferromagnetic target structure based on the differential signals output by the two magnetic field sensors.

Aspect 17 is a sensor device according to Aspect 16, wherein the processing unit is furthermore configured to carry out an automotive safety check based on the differential signals output by the two magnetic field sensors.

Aspect 18 is a sensor device according to any of Aspects 2 to 17, wherein: a first side edge of the magnet running in the second direction and the sensor elements of the first magnetic field sensor are congruent in a plan view of the first surface of the magnet, and a second side edge of the magnet running in the second direction and the sensor elements of the second magnetic field sensor are congruent in a plan view of the second surface of the magnet.

Aspect 19 is a sensor device according to any of the preceding aspects, furthermore comprising: a printed circuit board, wherein the first magnetic field sensor is electrically connected to a first surface of the printed circuit board via connecting conductors and the second magnetic field sensor is electrically connected to a second surface of the printed circuit board, the second surface being situated opposite the first surface, via connecting conductors.

Aspect 20 is a sensor device according to Aspect 19, wherein: the magnet has at least one cutout, and a mechanical connection between the printed circuit board and the magnet is provided by a printed circuit board section engaging into the at least one cutout of the magnet.

Aspect 21 is a sensor device according to any of the preceding aspects, wherein the first magnetic field sensor and the second magnetic field sensor are structurally identical.

Aspect 22 is a sensor device according to any of the preceding aspects, wherein the magnet and the two magnetic field sensors are encapsulated in a common encapsulation material.

Aspect 23 is a sensor device according to any of the preceding aspects, wherein the magnet is a permanent back-bias block magnet.

Aspect 24 is a sensor device according to any of the preceding aspects, wherein the magnetic field sensors are arranged in a top-read configuration relative to the magnet.

Aspect 25 is a method for producing a sensor device, wherein the method comprises: providing a magnet; mounting a first differential magnetic field sensor on a first surface of the magnet; and mounting a second differential magnetic field sensor on a second surface of the magnet, the second surface being situated opposite the first surface.

Aspect 26: A sensor device, comprising: a magnet; a first differential magnetic field sensor mounted on a first surface of the magnet; and a second differential magnetic field sensor mounted on a second surface of the magnet, the second surface being situated opposite the first surface.

Aspect 27: The sensor device according to any of the preceding aspects, wherein: the magnet is magnetized in a first direction, and each differential magnetic field sensor of the first differential magnetic field sensor and the second differential magnetic field sensor has a first sensor element and a second sensor element spaced apart from one another in a second direction perpendicular to the first direction.

Aspect 28: The sensor device according to any of the preceding aspects, wherein: the sensor device is arranged relative to a ferromagnetic target structure, and the sensor device and the ferromagnetic target structure are separated from one another by an air gap.

Aspect 29: The sensor device according to any of the preceding aspects, wherein: the ferromagnetic target structure has a linear ferromagnetic structure configured to move past the first differential magnetic field sensor and the second differential magnetic field sensor in the second direction.

Aspect 30: The sensor device according to any of the preceding aspects, wherein: the ferromagnetic target structure has a ferromagnetic wheel configured to rotate about an axis of rotation, and the axis of rotation either runs parallel to the first direction or runs in a third direction perpendicular to the first direction and perpendicular to the second direction.

Aspect 31: The sensor device according to any of the preceding aspects, wherein the first differential magnetic field sensor and the second differential magnetic field sensor are arranged offset with respect to the axis of rotation.

Aspect 32: The sensor device according to any of the preceding aspects, wherein, for each differential magnetic field sensor of the first differential magnetic field sensor and the second differential magnetic field sensor, it holds true that: the first sensor element and the second sensor element are sensitive in the first direction and in the second direction, a first differential signal output by the magnetic field sensor is based on a measurement of the first sensor element in the first direction and a measurement of the second sensor element in the first direction, and a second differential signal output by the magnetic field sensor is based on a measurement of the first sensor element in the second direction and a measurement of the second sensor element in the second direction.

Aspect 34: The sensor device according to any of the preceding aspects, wherein: each differential magnetic field sensor of the first differential magnetic field sensor and the second differential magnetic field sensor has a third sensor element arranged between the first sensor element and the second sensor element of the respective differential magnetic field sensor, all three sensor elements of the respective differential magnetic field sensor are sensitive in the first direction, a first differential signal output by the respective differential magnetic field sensor is based on a measurement of the first sensor element and a measurement of the second sensor element, and a second differential signal output by the respective differential magnetic field sensor is based on measurements of all three sensor elements.

Aspect 35: The sensor device according to any of the preceding aspects, wherein: the ferromagnetic target structure has a first track with a first number of openings and a second track with a second number of openings, the first number and the second number are different from one another, and the first differential magnetic field sensor is aligned with the first track and the second differential magnetic field sensor is aligned with the second track.

Aspect 36: The sensor device according to any of the preceding aspects, wherein the first number of openings is one less than the second number of openings.

Aspect 37: The sensor device according to any of the preceding aspects, further comprising: a processing unit configured to: receive the first differential signal and the second differential signal of each differential magnetic field sensor of the first differential magnetic field sensor and the second differential magnetic field sensor, determine a first relative angle based on the first differential signal and the second differential signal of the first differential magnetic field sensor, and determine a second relative angle based on the first differential signal and the second differential signal of the second differential magnetic field sensor.

Aspect 38: The sensor device according to any of the preceding aspects, wherein determining the first relative angle and determining the second relative angle are each based on an arc-tangent operation.

Aspect 39: The sensor device according to any of the preceding aspects, wherein the processing unit is configured to determine a rotation angle of the ferromagnetic target structure based on the first relative angle and the second relative angle.

Aspect 40: The sensor device according to any of the preceding aspects, wherein determining the rotation angle is based on a nonius operation.

Aspect 41: The sensor device according to any of the preceding aspects, wherein: the ferromagnetic target structure has a single track of openings, and the first differential magnetic field sensor and the second differential magnetic field sensor are aligned with the single track of openings.

Aspect 42: The sensor device according to any of the preceding aspects, further comprising: a processing unit configured to determine a speed of the ferromagnetic target structure based on differential signals output by the first differential magnetic field sensor and the second differential magnetic field sensor.

Aspect 43: The sensor device according to any of the preceding aspects, wherein the processing unit is further configured to carry out an automotive safety check based on the differential signals output by the first differential magnetic field sensor and the second differential magnetic field sensor.

Aspect 44: The sensor device according to any of the preceding aspects, wherein: a first side edge of the magnet running in the second direction and sensor elements of the first differential magnetic field sensor are congruent in a plan view of the first surface of the magnet, and a second side edge of the magnet running in the second direction and sensor elements of the second differential magnetic field sensor are congruent in a plan view of the second surface of the magnet.

Aspect 45: The sensor device according to any of the preceding aspects, further comprising: a printed circuit board, wherein the first differential magnetic field sensor is electrically connected to a first surface of the printed circuit board via connecting conductors and the second differential magnetic field sensor is electrically connected to a second surface of the printed circuit board via connecting conductors, the second surface being situated opposite the first surface.

Aspect 46: The sensor device according to any of the preceding aspects, wherein: the magnet has at least one cutout, and a mechanical connection between the printed circuit board and the magnet is provided by a printed circuit board section engaging into the at least one cutout of the magnet.

Aspect 47: The sensor device according to any of the preceding aspects, wherein the first differential magnetic field sensor and the second differential magnetic field sensor are structurally identical.

Aspect 48: The sensor device according to any of the preceding aspects, wherein the magnet, the first differential magnetic field sensor, and the second differential magnetic field sensor are encapsulated in a common encapsulation material.

Aspect 49: The sensor device according to any of the preceding aspects, wherein the magnet is a permanent back-bias block magnet.

Aspect 50: The sensor device according to any of the preceding aspects, wherein the first differential magnetic field sensor and the second differential magnetic field sensor are arranged in a top-read configuration relative to the magnet.

Aspect 51: A method for producing a sensor device, wherein the method comprises: providing a magnet; mounting a first differential magnetic field sensor on a first surface of the magnet; and mounting a second differential magnetic field sensor on a second surface of the magnet, the second surface being situated opposite the first surface. Although specific implementations have been illustrated and described herein, it is obvious to a person of average skill in the art that a multiplicity of alternative and/or equivalent implementations can replace the specific implementations shown and described, without departing from the scope of the present disclosure. This application is intended to cover all adaptations or variations of the specific implementations discussed herein. Therefore, the intention is for this disclosure to be restricted only by the claims and the equivalents thereof.

The invention claimed is:

1. A sensor device, comprising:

a magnet;

a first differential magnetic field sensor mounted on a first surface of the magnet; and a second differential magnetic field sensor mounted on a second surface of the magnet, the second surface being situated opposite the first surface.

2. The sensor device according to claim 1, wherein:

the magnet is magnetized in a first direction, and each differential magnetic field sensor of the first differential magnetic field sensor and the second differential magnetic field sensor has a first sensor element and a second sensor element spaced apart from one another in a second direction perpendicular to the first direction.

3. The sensor device according to claim 2, wherein:

the sensor device is arranged relative to a ferromagnetic target structure, and the sensor device and the ferromagnetic target structure are separated from one another by an air gap.

4. The sensor device according to claim 3, wherein:

the ferromagnetic target structure has a linear ferromagnetic structure configured to move past the first differential magnetic field sensor and the second differential magnetic field sensor in the second direction.

5. The sensor device according to claim 3, wherein:

the ferromagnetic target structure has a ferromagnetic wheel configured to rotate about an axis of rotation, and the axis of rotation either runs parallel to the first direction or runs in a third direction perpendicular to the first direction and perpendicular to the second direction.

6. The sensor device according to claim 5, wherein the first differential magnetic field sensor and the second differential magnetic field sensor are arranged offset with respect to the axis of rotation.

7. The sensor device according to claim 2, wherein, for each differential magnetic field sensor of the first differential magnetic field sensor and the second differential magnetic field sensor, it holds true that:

the first sensor element and the second sensor element are sensitive in the first direction and in the second direction, a first differential signal output by the differential magnetic field sensor is based on a measurement of the first sensor element in the first direction and a measurement of the second sensor element in the first direction, and a second differential signal output by the differential magnetic field sensor is based on a measurement of the first sensor element in the second direction and a measurement of the second sensor element in the second direction.

8. The sensor device according to claim 2, wherein:

each differential magnetic field sensor of the first differential magnetic field sensor and the second differential magnetic field sensor has a third sensor element arranged between the first sensor element and the second sensor element of the respective differential magnetic field sensor, all three sensor elements of the respective differential magnetic field sensor are sensitive in the first direction, a first differential signal output by the respective differential magnetic field sensor is based on a measurement of the first sensor element and a measurement of the second sensor element, and a second differential signal output by the respective differential magnetic field sensor is based on measurements of all three sensor elements.

9. The sensor device according to claim 3, wherein:

the ferromagnetic target structure has a first track with a first number of openings and a second track with a second number of openings, the first number and the second number are different from one another, and the first differential magnetic field sensor is aligned with the first track and the second differential magnetic field sensor is aligned with the second track.

10. The sensor device according to claim 9, wherein the first number of openings is one less than the second number of openings.

11. The sensor device according to claim 7, further comprising:

a processing unit configured to:

receive the first differential signal and the second differential signal of each differential magnetic field sensor of the first differential magnetic field sensor and the second differential magnetic field sensor, determine a first relative angle based on the first differential signal and the second differential signal of the first differential magnetic field sensor, and determine a second relative angle based on the first differential signal and the second differential signal of the second differential magnetic field sensor.

12. The sensor device according to claim 11, wherein determining the first relative angle and determining the second relative angle are each based on an arc-tangent operation.

13. The sensor device according to claim 11, wherein the sensor device is arranged relative to a ferromagnetic target structure, wherein the sensor device and the ferromagnetic target structure are separated from one another by an air gap, and wherein the processing unit is configured to determine a rotation angle of the ferromagnetic target structure based on the first relative angle and the second relative angle.

14. The sensor device according to claim 13, wherein determining the rotation angle is based on a nonius operation.

15. The sensor device according to claim 3, wherein:

the ferromagnetic target structure has a single track of openings, and the first differential magnetic field sensor and the second differential magnetic field sensor are aligned with the single track of openings.

16. The sensor device according to claim 15, further comprising:

a processing unit configured to determine a speed of the ferromagnetic target structure based on differential signals output by the first differential magnetic field sensor and the second differential magnetic field sensor.

17. The sensor device according to claim 16, wherein the processing unit is further configured to carry out an automotive safety check based on the differential signals output by the first differential magnetic field sensor and the second differential magnetic field sensor.

18. The sensor device according to claim 2, wherein:

a first side edge of the magnet running in the second direction and sensor elements of the first differential magnetic field sensor are congruent in a plan view of the first surface of the magnet, and a second side edge of the magnet running in the second direction and sensor elements of the second differential magnetic field sensor are congruent in a plan view of the second surface of the magnet.

19. The sensor device according to claim 1, further comprising:

a printed circuit board, wherein the first differential magnetic field sensor is electrically connected to a first surface of the printed circuit board via first connecting conductors and the second differential magnetic field sensor is electrically connected to a second surface of the printed circuit board via second connecting conductors.

20. The sensor device according to claim 19, wherein:

the magnet has at least one cutout arranged between the first surface of the magnet and the second surface of the magnet, and a section of the printed circuit board is inserted into the at least one cutout such that a mechanical connection between the printed circuit board and the magnet is provided by the section of the printed circuit board engaging into the at least one cutout of the magnet.

21. The sensor device according to claim 1, wherein the first differential magnetic field sensor and the second differential magnetic field sensor are structurally identical.

22. The sensor device according to claim 1, wherein the magnet, the first differential magnetic field sensor, and the second differential magnetic field sensor are encapsulated in a common encapsulation material.

23. The sensor device according to claim 20, wherein the at least one cutout extends into the magnet in a direction parallel to the first surface of the magnet and the second surface of the magnet.

24. The sensor device according to claim 19, wherein the printed circuit board is arranged at a midpoint between the first surface of the magnet and the second surface of the magnet, wherein the first connecting conductors extend from the first surface of the printed circuit board to a first metal carrier arranged on the first surface of the magnet, and wherein the second connecting conductors extend from the second surface of the printed circuit board to a second metal carrier arranged on the second surface of the magnet.

25. A method for producing a sensor device, wherein the method comprises:

providing a magnet;

mounting a first differential magnetic field sensor on a first surface of the magnet; and mounting a second differential magnetic field sensor on a second surface of the magnet, the second surface being situated opposite the first surface.

* * * * *